US012712674B2

(12) United States Patent
Elsherif et al.

(10) Patent No.: US 12,712,674 B2
(45) Date of Patent: Aug. 18, 2026

(54) WHOLE HOME CONNECTIVITY TRANSITION

(71) Applicant: QUALCOMM Incorporated, San Diego, CA (US)

(72) Inventors: Ahmed Ragab Elsherif, San Jose, CA (US); Sriman Miryala, Hyderabad (IN); Laurent Wojcieszak, Belfast (GB); Richard Turner, Belfast (GB)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/459,713

(22) Filed: Sep. 1, 2023

(65) Prior Publication Data

US 2025/0080277 A1 Mar. 6, 2025

(51) Int. Cl.
*H04L 5/00* (2006.01)
*H04L 1/1607* (2023.01)

(52) U.S. Cl.
CPC .......... *H04L 1/1642* (2013.01); *H04L 5/0048* (2013.01)

(58) Field of Classification Search
CPC ... H04L 1/1642; H04L 1/1635; H04L 5/0048; H04L 5/0051; H04W 72/044; H04W 72/0446; H04W 72/25; H04W 72/231
See application file for complete search history.

(56) References Cited

U.S. PATENT DOCUMENTS

| | | | | |
|---|---|---|---|---|
| 2003/0009717 A1* | 1/2003 | Fukushima | ............. | H04L 1/008 714/748 |
| 2013/0058314 A1* | 3/2013 | Broise | ................. | H04W 72/541 370/336 |
| 2020/0106699 A1* | 4/2020 | Chauhan | ................. | H04L 69/14 |
| 2021/0075549 A1* | 3/2021 | Bastani | ................. | H04L 1/1809 |

* cited by examiner

*Primary Examiner* — Jamal Javaid
(74) *Attorney, Agent, or Firm* — Harrity & Harrity, LLP

(57) ABSTRACT

Various aspects of the present disclosure generally relate to wireless communication. In some aspects, a wireless communication device may receive, from a peripheral device associated with a connection with the wireless communication device, a request indicating a destination wireless node. The wireless communication device may identify, based at least in part on the request, a final application sequence number of a set of packets associated with the connection. The wireless communication device may transmit the set of packets on the connection, the set of packets including an indication of the final application sequence number. Numerous other aspects are described.

30 Claims, 15 Drawing Sheets

Flash 210

Memory 206

ROM 208

MMU 240

Processor(s) 202

Connector Interface 220

Display Circuitry 204

Display 242

Antenna 235c

Antenna 235d

Antenna 235a

Antenna 235b

WLAN Controller 250

254

WPAN Controller 252

WWAN Controller 256

258

260

Radio 230

WHOLE HOME CONNECTIVITY TRANSITION

FIELD OF THE DISCLOSURE

Aspects of the present disclosure generally relate to wireless communication and to techniques and apparatuses associated with an end of burst indication for audio traffic.

BACKGROUND

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), Bluetooth Low Energy (BLE) (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data capacity throughput, and are susceptible to interference from other devices communicating in the same frequency band (such as via wireless local area network (WLAN) communications).

SUMMARY

In some aspects, a method of wireless communication performed by a wireless communication device includes receiving, from a peripheral device associated with a connection with the wireless communication device, a request indicating a destination wireless node; identifying, based at least in part on the request, a final application sequence number of a set of packets associated with the connection; and transmitting the set of packets on the connection, the set of packets including an indication of the final application sequence number.

In some aspects, a method of wireless communication performed by a peripheral device includes transmitting, to a wireless communication device associated with a connection with the peripheral device, a request indicating a destination wireless node; receiving one or more packets on the connection, the one or more packets omitting a packet associated with a final application sequence number; and transmitting, to the wireless communication device, an indication of a last received application sequence number of the one or more packets based at least in part on the one or more packets omitting the packet associated with the final application sequence number.

In some aspects, an apparatus for wireless communication at a wireless communication device includes one or more memories; and one or more processors, coupled to the one or more memories, configured to cause the wireless communication device to: receive, from a peripheral device associated with a connection with the wireless communication device, a request indicating a destination wireless node; identify, based at least in part on the request, a final application sequence number of a set of packets associated with the connection; and transmit the set of packets on the connection, the set of packets including an indication of the final application sequence number.

In some aspects, an apparatus for wireless communication at a peripheral device includes one or more memories; and one or more processors, coupled to the one or more memories, configured to cause the peripheral device to: transmit, to a wireless communication device associated with a connection with the peripheral device, a request indicating a destination wireless node; receive one or more packets on the connection, the one or more packets omitting a packet associated with a final application sequence number; and transmit, to the wireless communication device, an indication of a last received application sequence number of the one or more packets based at least in part on the one or more packets omitting the packet associated with the final application sequence number.

In some aspects, a non-transitory computer-readable medium storing a set of instructions for wireless communication includes one or more instructions that, when executed by one or more processors of a wireless communication device, cause the wireless communication device to: receive, from a peripheral device associated with a connection with the wireless communication device, a request indicating a destination wireless node; identify, based at least in part on the request, a final application sequence number of a set of packets associated with the connection; and transmit the set of packets on the connection, the set of packets including an indication of the final application sequence number.

In some aspects, a non-transitory computer-readable medium storing a set of instructions for wireless communication includes one or more instructions that, when executed by one or more processors of a peripheral device, cause the peripheral device to: transmit, to a wireless communication device associated with a connection with the peripheral device, a request indicating a destination wireless node; receive one or more packets on the connection, the one or more packets omitting a packet associated with a final application sequence number; and transmit, to the wireless communication device, an indication of a last received application sequence number of the one or more packets based at least in part on the one or more packets omitting the packet associated with the final application sequence number.

In some aspects, an apparatus for wireless communication includes means for receiving, from a peripheral device associated with a connection with the wireless communication device, a request indicating a destination wireless node;

means for identifying, based at least in part on the request, a final application sequence number of a set of packets associated with the connection; and means for transmitting the set of packets on the connection, the set of packets including an indication of the final application sequence number.

In some aspects, an apparatus for wireless communication includes means for transmitting, to a wireless communication device associated with a connection with the peripheral device, a request indicating a destination wireless node; means for receiving one or more packets on the connection, the one or more packets omitting a packet associated with a final application sequence number; and means for transmitting, to the wireless communication device, an indication of a last received application sequence number of the one or more packets based at least in part on the one or more packets omitting the packet associated with the final application sequence number.

Aspects generally include a method, apparatus, system, computer program product, non-transitory computer-readable medium, user equipment, base station, network entity, network node, central device, peripheral device, wireless communication device, access point, mobile station, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
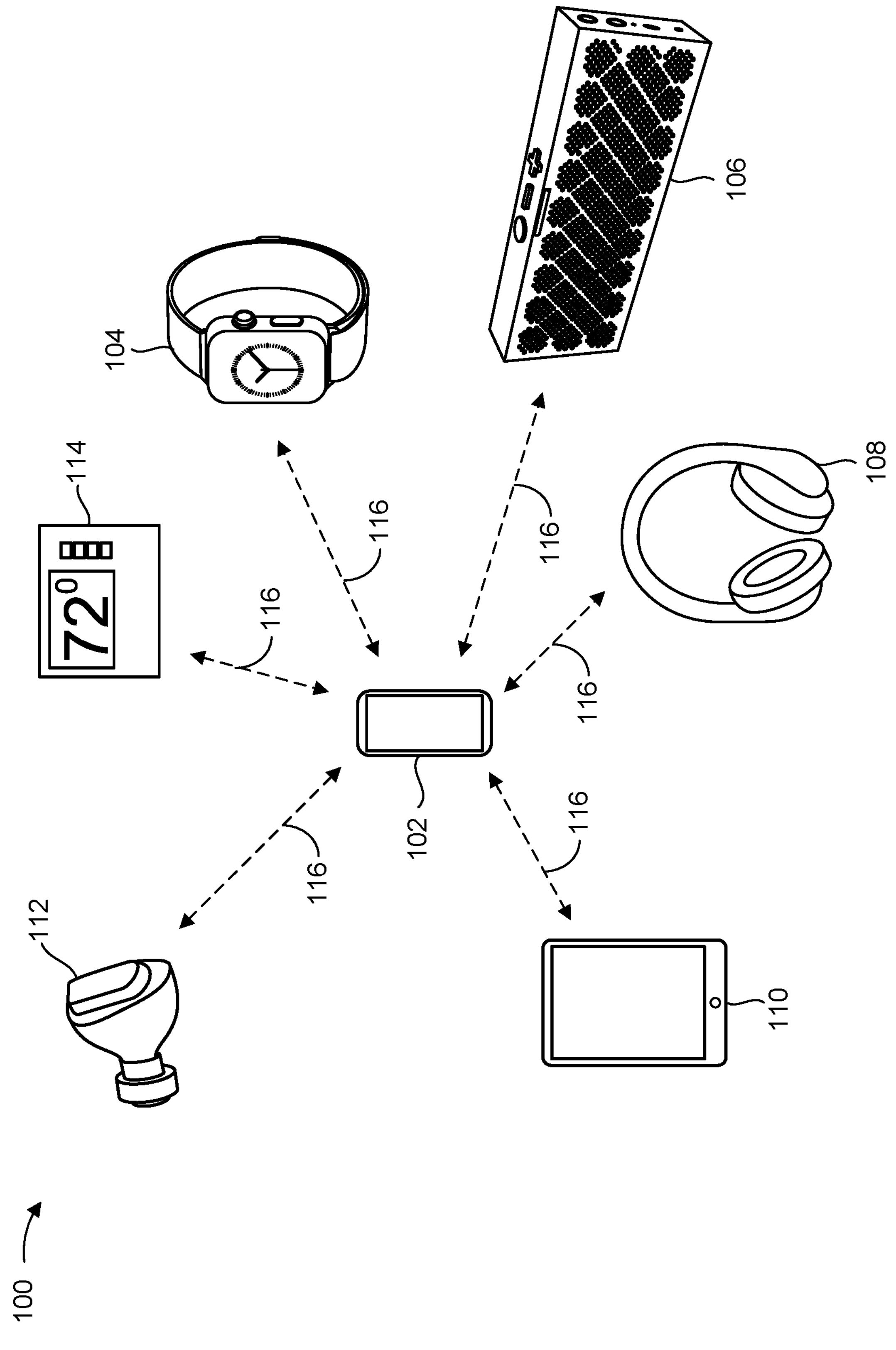
FIG. 1 is a diagram illustrating an example of a wireless personal area network (WPAN), according to some implementations.

In a wireless personal area network (WPAN), such as a Bluetooth (BT) network or a Bluetooth Low Energy (BLE) network, wireless audio may stream from a wireless communication device (e.g., a handset, a smartphone) to one or more peripheral devices (e.g., a left earbud and a right earbud). These devices may operate as part of an extended personal area network (XPAN) that provides whole home connectivity (WHC) (also referred to as whole house coverage, and applicable to locations other than a user's home), where the devices may connect to each other and work throughout a home or office. In an XPAN, Wi-Fi features of an access point (AP) can be used to extend the connection between the wireless communication device and the peripheral device(s) beyond the range of Bluetooth for better WHC. For example, the wireless communication device may transmit audio data to the AP, which will then transmit the audio data to the peripheral device(s). This means that a user can leave the wireless communication device on a desk in one room and hear the audio in the peripheral device(s) (or continue a phone call) in another room that is outside of the normal Bluetooth range (but within the range of the AP). In this way, a user does not need to carry the wireless communication device throughout the home or office to use peripheral devices.

Adding or removing an AP as an intermediate wireless node for a connection between a wireless communication device and a peripheral device may be associated with the possibility of some packets being dropped on the connection. For example, the peripheral device may provide a roaming request (indicating a destination wireless node which can be the wireless communication device or an AP) based on a link quality metric being worse than a threshold. As the peripheral device moves away from a current serving wireless node (referred to herein as a source wireless node), the link with the source wireless node may worsen, leading to some number of dropped packets. The dropped packets may lead to packet loss and audio issues.

Aspects of the present disclosure relate generally to transitioning associated with WHC. Some aspects more specifically relate to application sequence numbering of packets prior to a transition associated with WHC. In some aspects, a wireless node provides an indication of a final application sequence number of a packet, which a peripheral device can use to determine whether the peripheral device received a packet having the final application sequence number before transitioning to a destination wireless node. In some aspects, the peripheral device may transmit an indication of a last received application sequence number, which the wireless communication device can use to retransmit any missed packets (between the last received application sequence number and the final application sequence number) via the destination wireless node.

Particular aspects of the subject matter described in this disclosure can be implemented to realize one or more of the following potential advantages. In some examples, by providing the indication of the final application sequence number, the described techniques can be used to identify dropped packets in connection with WHC. By providing the last received application sequence number, the described techniques can facilitate retransmission, thereby reducing the occurrence of packet loss and audio issues. Furthermore, the described techniques can be used when the destination wireless node is an AP or a wireless communication device, and when the source wireless node is an AP or a wireless communication device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a wireless communication device 102 (which may be referred to herein as a source device or using other suitable terminology) may connect to and may establish a communication link 116 with one or more peripheral devices 104 through 114, such as a smartwatch, a Bluetooth portable speaker, wireless headphones, a tablet, a wireless earbud, or a smart appliance (which may be referred to herein as sink devices or using other suitable terminology) using a BLE protocol or a modified BLE protocol. The BLE protocol is part of the BT core specification and enables radio frequency communication operating within the globally accepted 2.4 GHz Industrial, Scientific, and Medical (ISM) band.

In some aspects, as described herein, the wireless communication device 102 may include suitable logic, circuitry, interfaces, processors, and/or code that may be used to communicate with the one or more peripheral devices 104, 106, 108, 110, 112, and/or 114 using the BLE protocol or the modified BLE protocol. In some aspects, the wireless communication device 102 may operate as an initiator to request establishment of a link layer (LL) connection with an intended peripheral device 104, 106, 108, 110, 112, and/or 114. In some aspects, a link manager may be used to control operations between a WPAN application controller in the wireless communication device 102 and a WPAN application controller in each of the intended peripheral devices 104, 106, 108, 110, 112, and/or 114.

In some aspects, after a requested LL connection is established, the wireless communication device 102 may become a host device, and the selected or intended peripheral device 104, 106, 108, 110, 112, and/or 114 may become paired with the wireless communication device 102 over the established LL connection. As a host device, the wireless communication device 102 may support multiple concurrent LL connections with various peripheral devices 104, 106, 108, 110, 112, and/or 114 that are operating as client devices. For example, the wireless communication device 102 may manage various aspects of data packet communication in an LL connection with one or more associated peripheral devices 104, 106, 108, 110, 112, and/or 114. For example, the wireless communication device 102 may determine an operation schedule in the LL connection with one or more peripheral devices 104, 106, 108, 110, 112, and/or 114. The wireless communication device 102 may also initiate an LL protocol data unit (PDU) exchange sequence over the LL connection. LL connections may be configured to run periodic connection events in dedicated data channels. The exchange of LL data PDU transmissions between the wireless communication device 102 and one or more of the peripheral devices 104, 106, 108, 110, 112, and/or 114 may take place within connection events.

In some aspects, the wireless communication device 102 may be configured to transmit the first LL data PDU in each connection event to an intended peripheral device 104, 106, 108, 110, 112, and/or 114. Additionally, or alternatively, in some aspects, the wireless communication device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the wireless communication device 102. In some other aspects, a peripheral device 104, 106, 108, 110, 112, and/or 114 may transmit an LL data PDU to the wireless communication device 102 without first receiving an LL data PDU from the wireless communication device 102.

Examples of the wireless communication device 102 may include a cellular phone, a smartphone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an Internet-of-Things (IoT) device, or the like.

Examples of the one or more peripheral devices 104, 106, 108, 110, 112, and/or 114 may include a cellular phone, a smartphone, an SIP phone, an STA, a laptop, a PC, a desktop computer, a PDA, a satellite radio, a global positioning system, a multimedia device, a video device, a digital audio player, a camera, a game console, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the wireless communication device 102 is illustrated in FIG. 1 as being in communication with six peripheral devices 104, 106, 108, 110, 112, and 114 in the WPAN 100, it will be appreciated that the wireless communication device 102 may communicate with more or fewer than six peripheral devices within the WPAN 100 without departing from the scope of the present disclosure. It should be noted that "peripheral device" (in the singular) can refer to a single device or to multiple devices that operate collectively. For example, "peripheral device" can refer to a single earbud, or to a pair of earbuds. Reference to "a peripheral device" is not limiting to a single peripheral device, and multiple peripheral devices can perform actions (e.g., all actions or a subset of actions) described as being performed by "a peripheral device."

In some aspects, a device implementing the BT protocol (e.g., the wireless communication device 102) may operate according to a first radio mode (e.g., a basic rate (BR)/enhanced data rate (EDR) radio mode), and a device implementing the BLE protocol may operate according to a second radio mode (e.g., the BLE radio mode). In some aspects, the wireless communication device 102 may be configured with dual radio modes, and therefore may be able to operate according to the BR/EDR mode or the BLE mode, for example, based on the type of short-range wireless communication in which the wireless communication device 102 may engage.

For example, in some aspects, the wireless communication device 102 may operate according to the BR/EDR mode for continuous streaming of data, for broadcast networks, for mesh networks, and/or for some other applications in which a relatively higher data rate may be more suitable. Additionally, or alternatively, the wireless communication device 102 may operate according to the BLE mode for short burst data transmissions, such as for some other applications in which power conservation may be desirable and/or a relatively lower data rate may be acceptable. Additionally, or alternatively, in some aspects, the wireless communication device 102 may operate according to one or more other radio modes, such as proprietary radio mode(s). Examples of other radio modes may include high speed radio modes, low energy radio modes, and/or isochronous radio modes, among other examples.

As indicated above, FIG. 1 is provided as an example. Other examples may differ from what is described with regard to FIG. 1.

Figure 2:
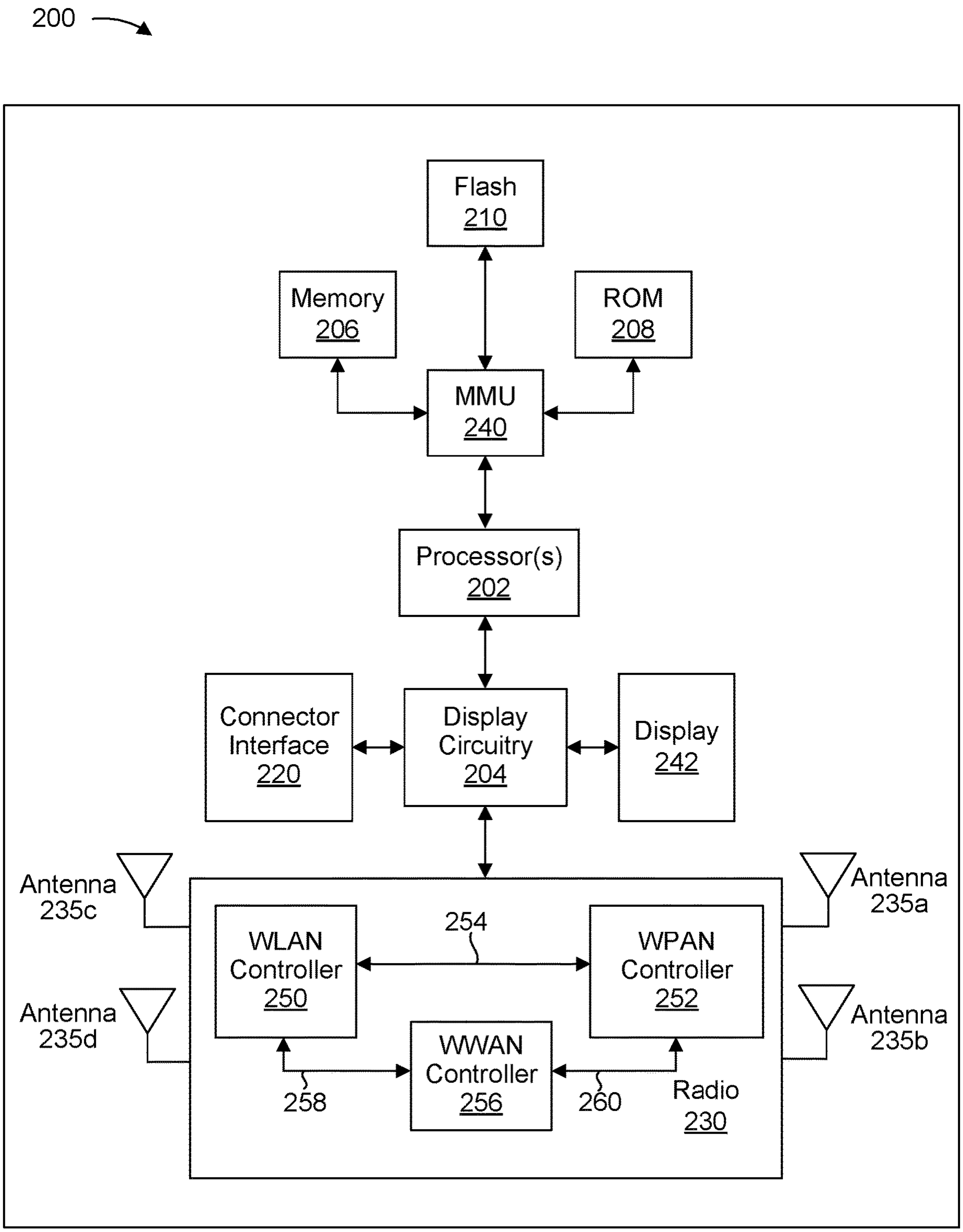
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the wireless communication device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device).

As shown in FIG. 2, the wireless communication device 200 may include a processing element, such as processor(s) 202, which may execute program instructions for the wireless communication device 200. The processing element may comprise one or more processors 202 which may perform operations individually or collectively. Performing operations collectively can include different processors 202 performing different operations of a group of operations. The wireless communication device 200 may also include a display 242 that can perform graphics processing and present information to a user. The processor(s) 202 may also be coupled to a memory management unit (MMU) 240, which may be configured to receive addresses from the processor (s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202. Memory 206 may comprise one or more memories which may perform operations individually or collectively. Performing operations collectively can include different memories performing different operations of a group of operations.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) or 6G subsystem). The wireless communication device 200 may include multiple antennas 235*a*, 235*b*, 235*c*, and/or 235*d* for performing wireless communication with, for example, wireless communication devices in a WPAN. In some aspects, the WPAN may be an extended PAN (XPAN).

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235*a*, 235*b*, 235*c*, and 235*d*. In other configurations, the WPAN controller 252 may be configured to communicate with at least one second device in a WPAN using one or more, some, or all of the antennas 235*a*, 235*b*, 235*c*, and 235*d*. In other configurations, the WWAN controller 256 may be configured to communicate with a second device in a WPAN using one or more, some, or all of the antennas 235*a*, 235*b*, 235*c*, and 235*d*. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the wireless communication device 102 (e.g., a source device) to connect or "pair" with a peripheral device. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the wireless communication device 102, and a peripheral device. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the wireless communication device 102) and a peripheral device. For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a central device (e.g., a wireless communication device 102, a handset, a user equipment (UE), an AP, a STA) includes means for transmitting a start indication that indicates a start of a burst; means for transmitting the burst; and/or means for transmitting an end indication that indicates an end of the burst. The means for the central device to perform operations described herein may include, for example, one or more of antennas 235*a*-235*d*, WPAN controller 252, radio 230, and/or processor 202, among other examples.

In some aspects, a peripheral device (e.g., earbud, wearable device, portable speaker) includes means for receiving a first start indication that indicates a start of a first burst; means for receiving the first burst; and/or means for receiving a first end indication that indicates an end of the first burst. The means for the central device to perform operations described herein may include, for example, one or more of antennas 235*a*-235*d*, WPAN controller 252, radio 230, and/or processor 202, among other examples.

As indicated above, FIG. 2 is provided as an example. Other examples may differ from what is described with regard to FIG. 2.

Figure 3:
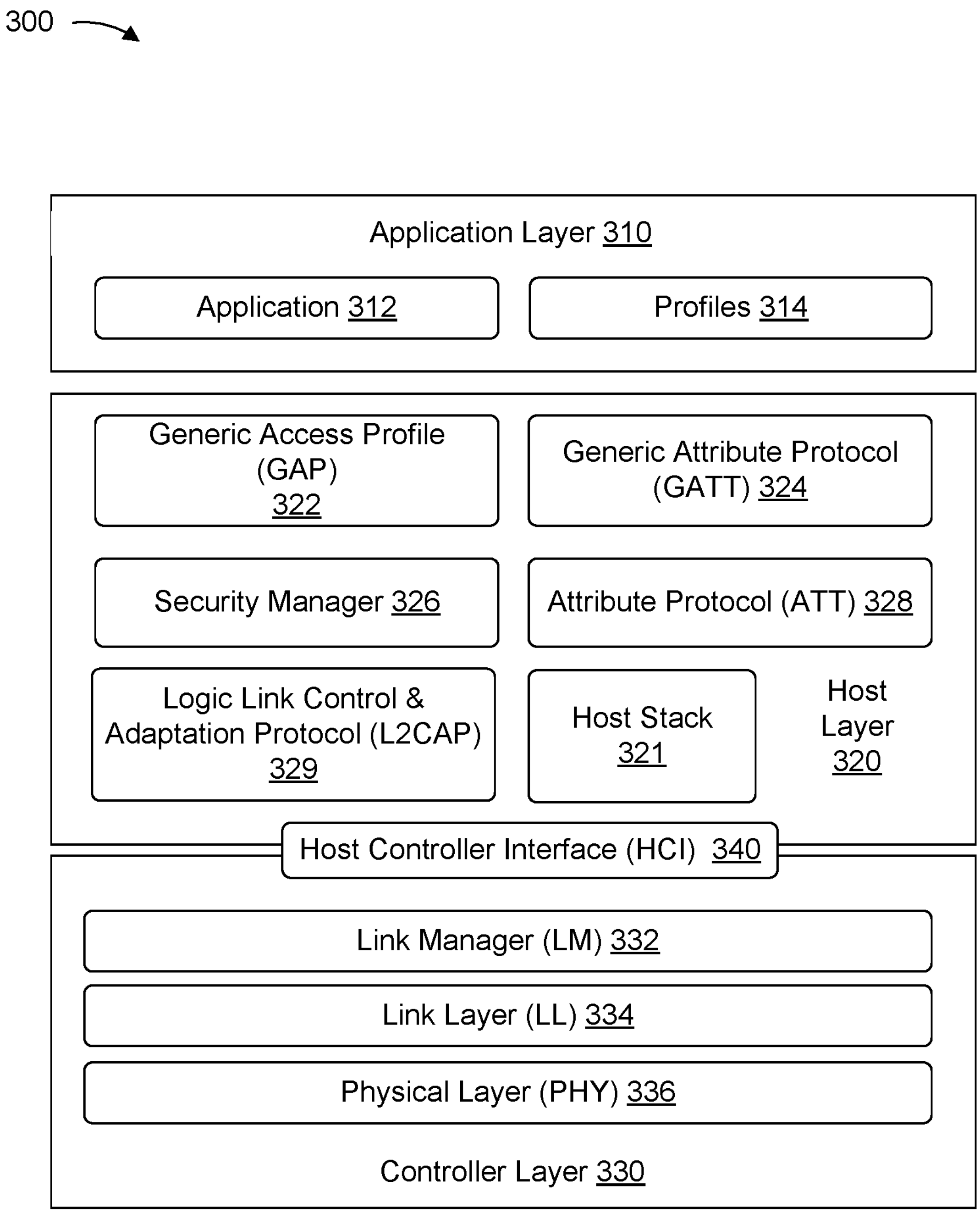
FIG. 3 is a diagram illustrating an example of a protocol stack, in accordance with the present disclosure.

FIG. 3 is a diagram illustrating an example 300 of a protocol stack (e.g., a WPAN and/or a Bluetooth protocol stack), in accordance with the present disclosure. In some aspects, the protocol stack 300 may be implemented in a wireless communication device (such as the wireless communication device 102 or one or more of the peripheral devices 104, 106, 108, 110, 112, or 114 of FIG. 1). For example, the protocol stack 300 may be implemented by one or more of processor(s) 202, memory 206, flash memory 210, ROM 208, the radio 230, and/or the WPAN controller 252 illustrated in FIG. 2. In some aspects, the protocol stack 300 may be organized into three layers that include an application layer 310, a host layer 320, and a controller layer 330.

In some aspects, the application layer 310 may be a user application layer that interfaces with the other blocks and/or layers of the protocol stack 300. In some aspects, the application layer 310 may include one or more applications 312 and one or more Bluetooth profiles 314 that allow the one or more applications 312 to use Bluetooth and/or BLE communications. The host layer 320 may include the upper layers of the protocol stack 300, and may communicate with a controller (such as the WPAN controller 252 of FIG. 2) in a wireless communication device using a host controller interface (HCI) 340. In some aspects, the host layer 320 may include a host stack 321 that can be used for application layer interface management to allow an application 312 to access WPAN communications.

The controller layer 330 may include the lower layers of the protocol stack 300. In some aspects, the controller layer 330 may be used for hardware interface management, link establishment, and link management. As shown in FIG. 3, the controller layer 330 may include a link manager (LM) 332, a link layer 334, and a physical (PHY) layer 336. The PHY layer 336 may include, for example, a radio and/or a baseband processor. In some aspects, the PHY layer 336 may define a mechanism for transmitting a bit stream over a physical link or channel that connects WPAN devices. The bit stream may be grouped into code words or symbols, and may be converted to a data packet that is transmitted over a wireless transmission medium. The PHY layer may assign sequence numbers to data packets transmitted over the wireless transmission medium. These sequence numbers may be different than application sequence numbers described herein. The PHY layer 336 may provide an electrical, mechanical, and/or procedural interface to the wireless transmission medium. The PHY layer 336 may be responsible for modulation and demodulation of data into radio frequency (RF) signals for transmission over the air. The PHY layer 336 may describe the physical characteristics of a transmitter/receiver (or transceiver) included in a wireless communication device. The physical characteristics may include modulation characteristics, an RF tolerance, and/or a sensitivity level, among other examples.

In some aspects, the link layer 334 is responsible for low-level communication over the PHY layer 336. The link layer 334 may manage the sequence and timing for transmitting and receiving data packets, and using an LL protocol, communicates with other devices regarding connection parameters and data flow control. The link layer 334 also provides gatekeeping functionality to limit exposure and data exchange with other devices. If filtering is configured, the link layer 334 maintains a list of allowed devices and may ignore all requests for data exchange from devices not on the list of allowed devices. The link layer 334 may also reduce power consumption. In some aspects, the link layer 334 may include a proprietary LL that may be used to discover peer devices, and establish a secure communication channel with the peer devices. In some aspects, the link layer 334 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The link manager 332 may be responsible for establishing and configuring links and managing power-change requests, among other tasks. Each type of logical link, such as ACL links, A2DP links, SCO links, eSCO links, ISO links, or the like, may be associated with a specific packet type. For example, an SCO link may provide reserved channel bandwidth for communication between a central device and a peripheral device, and may support regular, periodic exchange of data packets with no retransmissions. An eSCO link may provide reserved channel bandwidth for communication between a source device and a peripheral device, and support regular, periodic exchange of data packets with retransmissions. An ACL link may exist between a source device and a peripheral device from the beginning of establishment of a connection between the source device and the peripheral device, and the data packets for ACL links may include encoding information in addition to a payload.

The link manager 332 may communicate with the host layer 320 using the HCI 340. In some aspects, the link manager 332 may translate commands associated with the HCI 340 into controller-level operations, such as baseband-level operations. The HCI 340 may act as a boundary between the lower layers (such as between the controller layer 330, the host layer 320, and the application layer 310). The BT specification may define a standard HCI to support BT systems that are implemented across two separate processors. For example, a BT system on a computer may use a processor of the BT system to implement the lower layers of the protocol stack 300, such as the PHY layer 336, the link layer 334, and/or the link manager 332, and may use a processor of a BT component to implement the other layers of the protocol stack 300, such as the host layer 320 and the application layer 310.

In FIG. 3, the host layer 320 is shown to include a generic access profile (GAP) 322, a generic attribute protocol (GATT) 324, a security manager (SM) 326, an attribute protocol (ATT) 328, and an L2CAP layer 329. The GAP 322 may provide an interface for an application 312 to initiate, establish, and manage connections with other WPAN (e.g., BT or BLE) devices. The GATT 324 may provide a service framework using the attribute protocol for discovering services, and for reading and writing characteristic values on a peer device. The GATT 324 may interface with the application 312, for example, through a profile which may define a collection of attributes and any permissions needed for the attributes to be used in BT or BLE communications.

The security manager 326 may be responsible for device pairing and key distribution. A security manager protocol implemented by the security manager 326 may define how communications with the security manager of a counterpart BLE device are performed. The security manager 326 provides additional cryptographic functions that may be used by other components of the protocol stack 300. The architecture of the security manager 326 used in WPAN communications is designed to minimize recourse requirements for peripheral devices by shifting work to a presumably more powerful central device. BLE uses a pairing mechanism for key distribution. The security manager 326 provides a mechanism to encrypt the data and a mechanism to provide data authentication.

The ATT 328 includes a client/server protocol based on attributes associated with a BLE device configured for a particular purpose. Examples may include monitoring heart rate, temperature, broadcasting advertisements, or the like. The attributes may be discovered, read, and written by peer devices. The set of operations which are executed over the ATT 328 may include error handling, server configuration, find information, read operations, write operations, and/or queued writes. The ATT 328 may form the basis of data exchange between BT and BLE devices.

The L2CAP layer 329 may be implemented above the HCI 340, and may communicate with the controller layer 330 through the HCI 340. The L2CAP layer 329 may be responsible for establishing connections across one or more existing logical links and for requesting additional links if none exist. The L2CAP layer 329 may also implement multiplexing between different higher-layer protocols, for example, to allow different applications to use a single link, such as a logical link, including an ACL link. In some implementations, the L2CAP layer 329 may encapsulate multiple protocols from the upper layers into a data packet format (and vice versa). The L2CAP layer 329 may also break packets with a large data payload from the upper layers into multiple packets with the data payload segmented into smaller size data payloads that fit into a maximum payload size (for example, twenty-seven (27) bytes) on the transmit side.

As indicated above, FIG. 3 is provided as an example. Other examples may differ from what is described with regard to FIG. 3.

Figure 4:
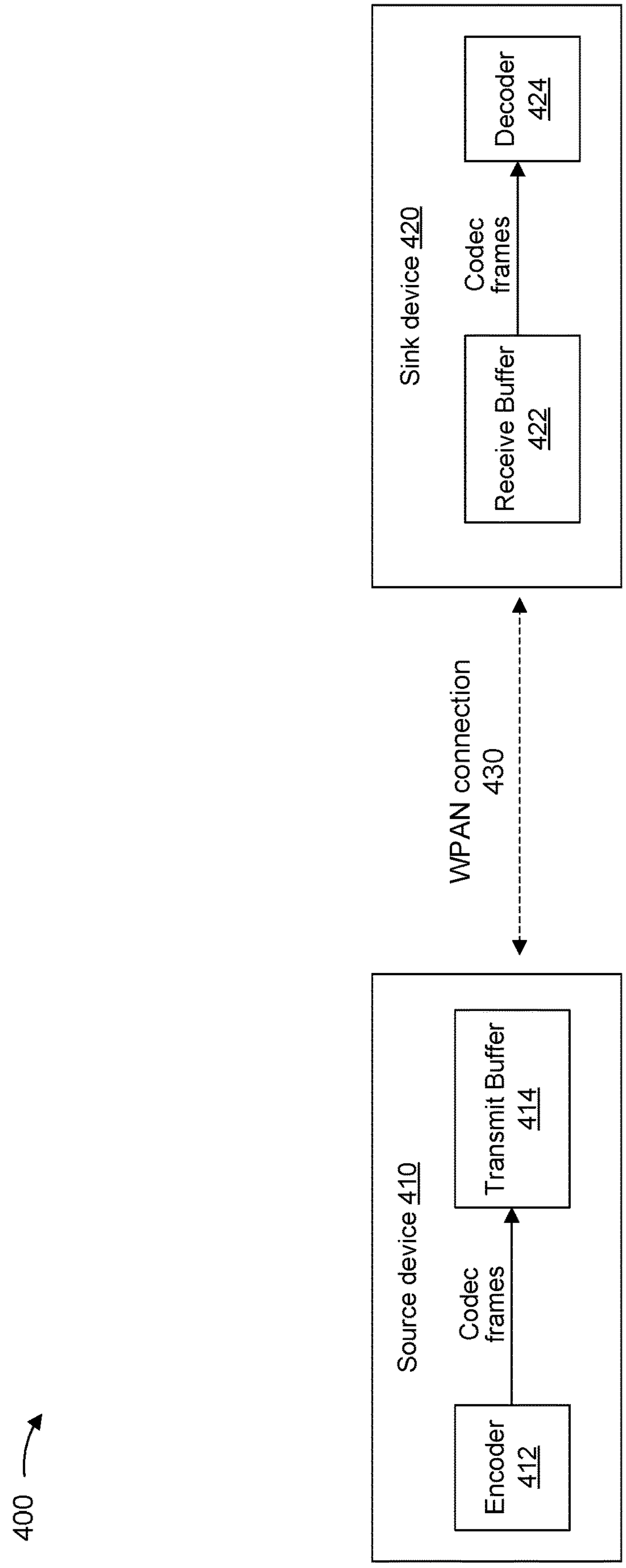
FIG. 4 is a diagram illustrating an example transmission of a data packet from a source device to a sink device over a WPAN connection, according to the present disclosure.

FIG. 4 is a diagram illustrating an example transmission 400 of a data packet from a source device 410 to a sink device 420 over a WPAN connection 430, according to the present disclosure. In some aspects, the source device 410 may be one example of the wireless communication device 102 in FIG. 1 and/or the wireless communication device 200 in FIG. 2, and the sink device 420 may be an example of one or more of the peripheral devices 104, 106, 108, 110, 112 or 114 in FIG. 1. In some aspects, the sink device 420 may be a wireless earbud, a pair of wireless earbuds, a wireless portable speaker, or another suitable device. The WPAN connection 430 may be any suitable Bluetooth or BLE connection or link. In some instances, the WPAN connection 430 may be one or more of an ACL link, an L2CAP link, an A2DP link, an SCO link, or an ISO link.

As shown in FIG. 4, the source device 410 may include an encoder 412 and a transmit buffer 414. The encoder 412 may be configured to encode data, such as audio or video data, using a specified bitrate. The transmit buffer 414 may be configured to queue data packets that are to be transmitted over the WPAN connection 430 to the sink device 420. In some implementations, the data packets to be transmitted over the WPAN connection 430 may have a predefined size, for example, based on the type of WPAN connection 430 and/or channel conditions associated with the WPAN connection 430. In some aspects, data encoded by the encoder 412 may be packetized into a data packet of a predefined size. The source device 410 may de-queue data packets from the transmit buffer 414 and transmit the data packets to the sink device 420 over the WPAN connection 430.

As further shown in FIG. 4, the sink device 420 may include a receive buffer 422 and a decoder 424. Data packets that the sink device 420 receives over the WPAN connection 430 may be queued or otherwise stored in the receive buffer 422. The data packets may be output from the receive buffer 422 and forwarded to the decoder 424. In some aspects, the decoder 424 may decode data (such as audio and/or video data) carried in the payloads of the queued data packets, and forward the decoded data to upper layers of the protocol stack for processing and playback to a user. In some implementations, the encoder 412 may encode a first encoder/decoder (codec) frame using a first bitrate and forward the first codec frame to the transmit buffer 414 to be packetized for transmission to the sink device 420 over the WPAN connection 430. The sink device 420 may queue the received data packet in the receive buffer 422 and may forward the first portion of the first codec frame to the decoder 424 for decoding.

As indicated above, FIG. 4 is provided as an example. Other examples may differ from what is described with regard to FIG. 4.

Figure 5:
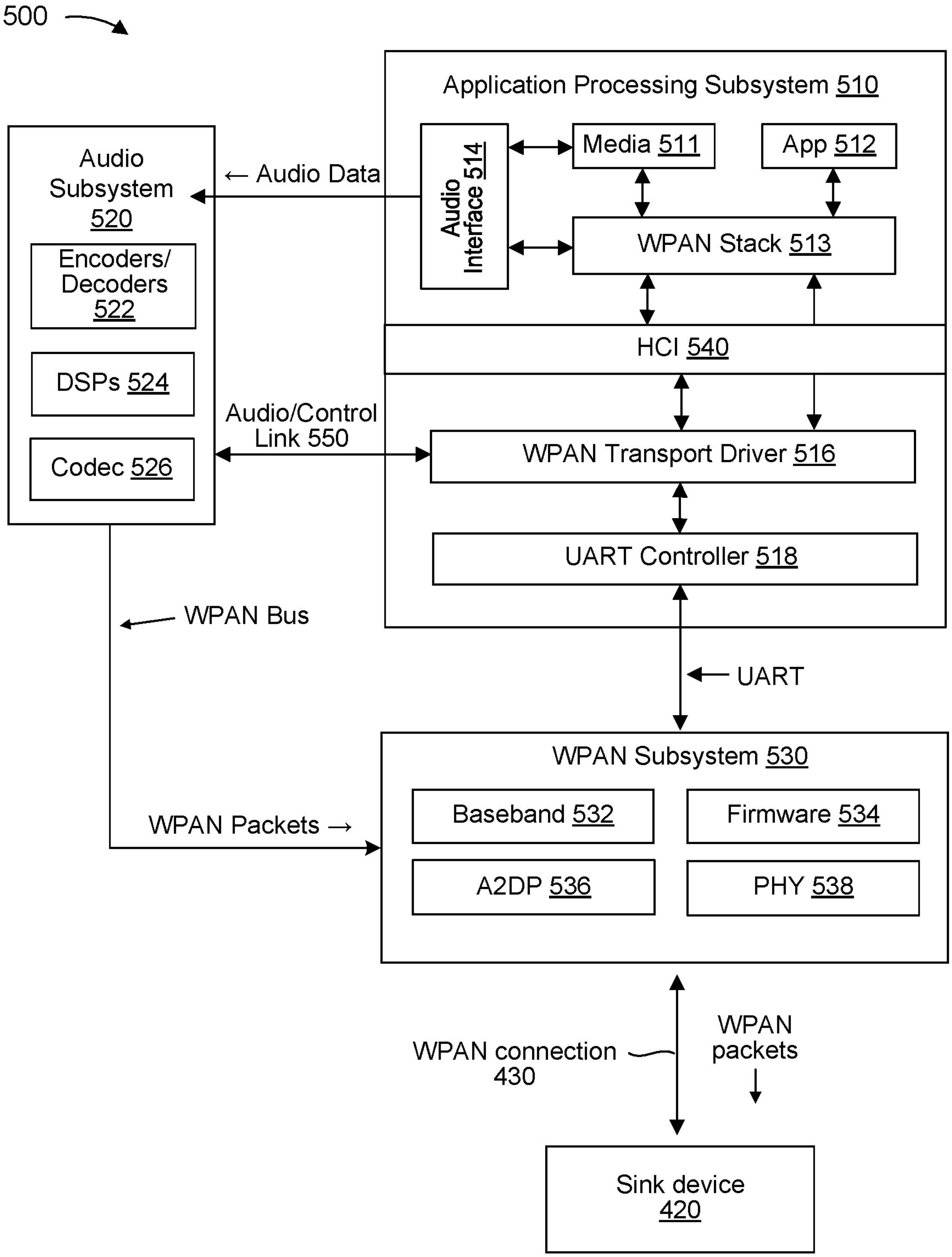
FIG. 5 is a diagram illustrating an example of a wireless communication device, according to the present disclosure.

FIG. 5 is a diagram illustrating an example 500 of a wireless communication device 500, according to the present disclosure. In some aspects, the wireless communication device 500 may be an example of the wireless communication device 102 in FIG. 1, the wireless communication device 200 in FIG. 2, or the source device 410 in FIG. 4. In example 500, the wireless communication device 500 is depicted as having an established WPAN connection 430 (e.g., a Bluetooth communication connection) with the sink device 420 in FIG. 4.

The wireless communication device 500 may include an application processing subsystem 510, an audio subsystem 520, a WPAN subsystem 530, and an HCI 540. The application processing subsystem 510, which may correspond to at least some portions of the application layer 310 and the host layer 320 of the protocol stack 300 of FIG. 3, is shown to include a media player 511, an application layer 512, a WPAN stack 513, and an audio interface 514. The media player 511 can be any suitable device or component capable of generating or receiving multimedia content including, for example, real-time audio streams, real-time video streams, real-time gaming streams, and/or latency-sensitive traffic, among other examples. The application layer 512, which may be one implementation of the application layer 310 of FIG. 3, includes at least one Bluetooth profile that defines the collection of attributes and associated permissions to be used in Bluetooth or BLE communications. In some aspects, the application layer 512 may include processing resources including, for example, the memory 206, the ROM 208, and/or the flash memory 210 of FIG. 2. The WPAN stack 513 may be one implementation of the protocol stack 300 of FIG. 3.

In some aspects, as shown in FIG. 5, the application processing subsystem 510 may include a WPAN transport driver 516, which may include a split audio and packetization module (not shown for simplicity) that can packetize data (such as audio and/or video data) into Bluetooth frames that can be transmitted to the sink device 420 using a Bluetooth and/or BLE protocol. In some aspects, the WPAN transport driver 516 may be connected to the audio subsystem 520 via an audio and control link 550. In some aspects, the audio and control link 550 may be used to send encoded audio/video data and control signals between the WPAN transport driver 516 and audio/video DSPs within the audio subsystem 520. The WPAN transport driver 516 is also connected to a universal asynchronous receiver-transmitter (UART) controller 518 that provides controls for transmission of information via the WPAN connection 430.

The audio subsystem 520 may include encoders/decoders 522, one or more DSPs 524, and one or more codecs 526. The encoders/decoders 522 may be used to sample audio/video data extracted from one or more packets received from another wireless communication device. The extracted audio/video data may be processed in the application processing subsystem 510 based at least in part on the Bluetooth profile. In some implementations, the encoders/decoders 522 may partition the sampled audio/video data into payloads that can be embedded within one or more Bluetooth packets for transmission to the sink device 420 over the WPAN connection 430. In some instances, the DSPs 524 and/or the codecs 526 may employ one or more encoding or decoding algorithms in conjunction with sampling the audio data.

The WPAN subsystem 530 may include a baseband component 532 (e.g., a Bluetooth baseband component), a firmware component 534, an A2DP component 536, and a PHY component 538. The baseband component 532 and the firmware component 534 may be used to generate baseband signals for constructing and deconstructing data frames based on the Bluetooth or BLE protocol. The baseband component 532 and the firmware component 534 may also be used to generate carrier signals for up-converting baseband signals during data transmissions and for down-converting received data signals to baseband. The A2DP component 536 may be used to control or manage an A2DP link between the wireless communication device 500 and the sink device 420. Specifically, when the WPAN subsystem 530 is in a receive mode, the PHY component 538 can be used to receive, demodulate, and down-convert data packets received over the WPAN connection 430, and to forward the data packets to the application processing subsystem 510. When the WPAN subsystem 530 is in a transmit mode, the PHY component 538 can be used to encapsulate data provided from the upper layers into one or more Bluetooth frames or packets for transmission to the sink device 420 over the WPAN connection 430.

As indicated above, FIG. 5 is provided as an example. Other examples may differ from what is described with regard to FIG. 5.

Figure 6:
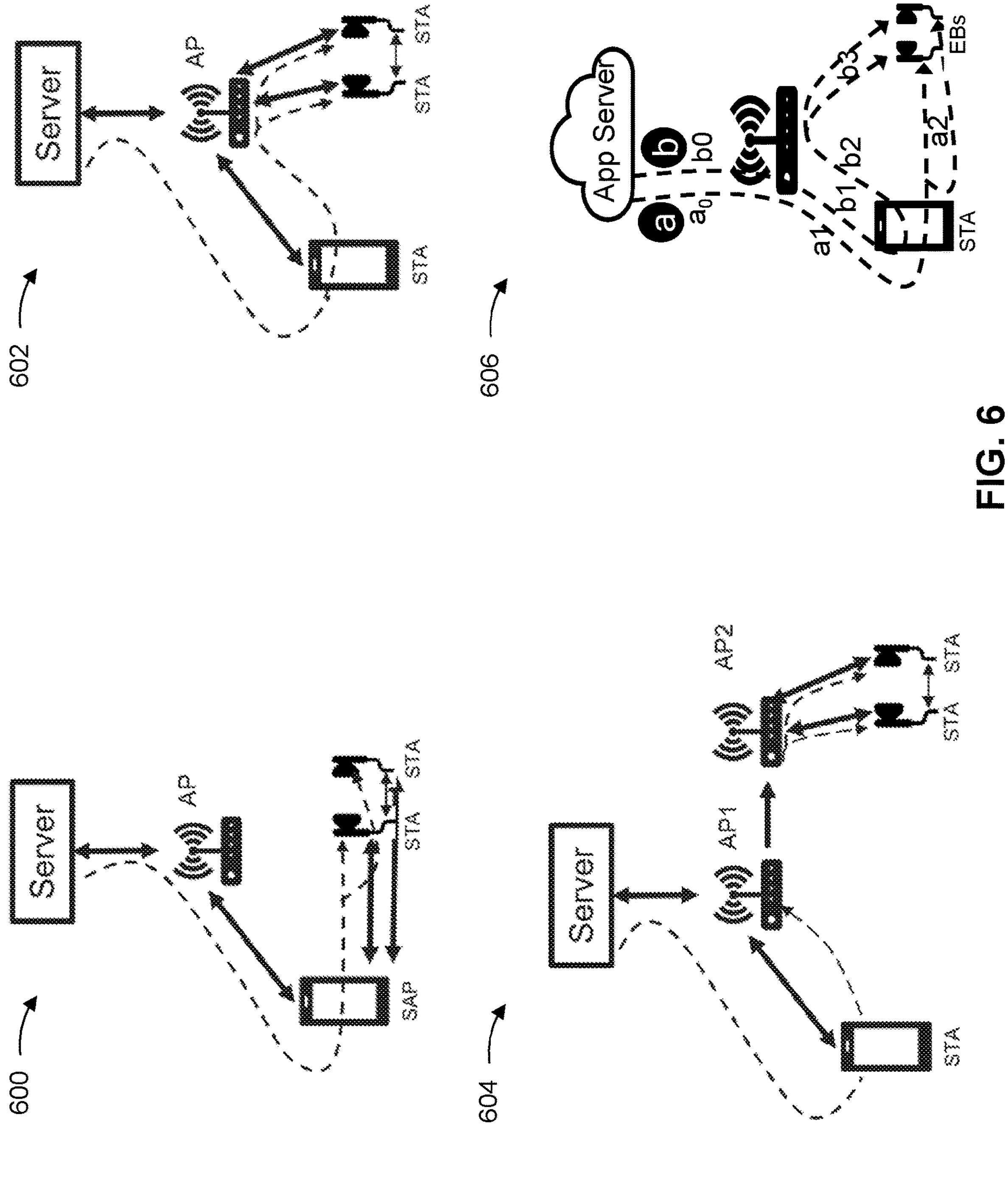
FIG. 6 is a diagram illustrating examples of extended personal area network (XPAN) topologies, in accordance with the present disclosure.

FIG. 6 is a diagram illustrating examples 600, 602, 604, and 606 of XPAN topologies, in accordance with the present disclosure.

A wireless communication device, such as a handset (HS) device or STA (e.g., phone), may operate as part of an XPAN that provides WHC. In an XPAN, the Bluetooth upper layers of the protocol stack can be reused and a transport flow from the Bluetooth controller to the Wi-Fi controller for transmitting audio packets can be changed such that the handset can connect to peripheral devices (e.g., earbuds) via an AP. By connecting to an AP, Wi-Fi features can be used to extend the connection between the handset and the earbuds beyond the range of Bluetooth for better WHC. For example, the handset may transmit audio data to an AP, which will then transmit the audio data to the earbuds. This means that a user can leave the handset on a desk in one room and hear the audio in the earbuds (or continue a phone call) in another room that is outside of the normal Bluetooth range (but within the range of the AP). In this way, a user does not need to carry the handset throughout the home or office to use wireless earbuds.

Example 600 shows an XPAN topology where a wireless communication device (e.g., handset) may communicate with peripheral devices (e.g., earbuds (EB)) or other STAs as part of a peer-to-peer (P2P) link that uses low energy (LE) protocols (e.g., BLE protocols). With P2P, the handset sends Wi-Fi information to the earbuds vie BLE and the earbuds can use Wi-Fi. The handset may provide communications between the peripheral devices and an AP. The handset has a Wi-Fi direct link or a cellular link to the AP. A link between the handset and the peripheral devices may be a Wi-Fi link (e.g., 6 gigahertz, 5 gigahertz, or 2 gigahertz) or an LE protocol link (e.g., BLE). Control signaling may occur over LE ACL. There may be a one layer to two layer (1L2) flow or a one layer to four layer (1L4) flow in uplink or downlink. Communications may be target wake time (TWT)-based with synchronized end-to-end (E2E) timing. TWT involves the use of a schedule for waking up to communicate and powering down to conserve power. This XPAN topology may obtain improved power and concurrency performance.

Example 602 shows an XPAN topology with communications between a handset and earbuds over one AP. There may be control information or a switching request that uses Wi-Fi transmission control protocol (TCP), such as via GATT, or a GLink. A link between the handset and the AP may comprise a WiFi direct link or a cellular link. A link between the handset and the peripheral devices (via the AP) may be a Wi-Fi link (e.g., 6 gigahertz, 5 gigahertz, or 2 gigahertz) or an LE protocol link (e.g., BLE). This topology may provide a higher range (potentially at the cost of higher latency and increased earbud power consumption) relative to a direct link between the handset and the earbuds.

Example 604 shows an XPAN topology that involves an AP-to-AP link, where the APs use the same subnet or a different subnet. The handset and earbuds may communicate over two or more APs. The earbuds may roam, and the AP mesh network manages the link. This XPAN topology may have more latency and consume more power than other XPAN topologies. There may be control information or a switching request that uses Wi-Fi TCP, such as via GATT. A link between the handset and the AP may comprise a WiFi direct link or a cellular link. A link between the handset and the peripheral devices (via the AP) may be a Wi-Fi link (e.g., 6 gigahertz, 5 gigahertz, or 2 gigahertz) or an LE protocol link (e.g., BLE).

Example 606 shows an XPAN topology that involves links from an application server to earbuds through a handset (e.g., STA) or an AP. The link $a_1$ from the application server to the handset may be Wi-Fi or cellular. The P2P link $a_2$ from the handset to the earbuds may be Wi-Fi (e.g., 6 gigahertz, 5 gigahertz, or 2 gigahertz) or an LE protocol link (e.g., BLE). The link $b_1$ from the handset to the AP may be Wi-Fi or cellular. The link $b_2$ and $b_3$ can be Wi-Fi (e.g., 6 gigahertz, 5 gigahertz, or 2 gigahertz).

As indicated above, FIG. 6 is provided as an example. Other examples may differ from what is described with regard to FIG. 6.

Figure 7:
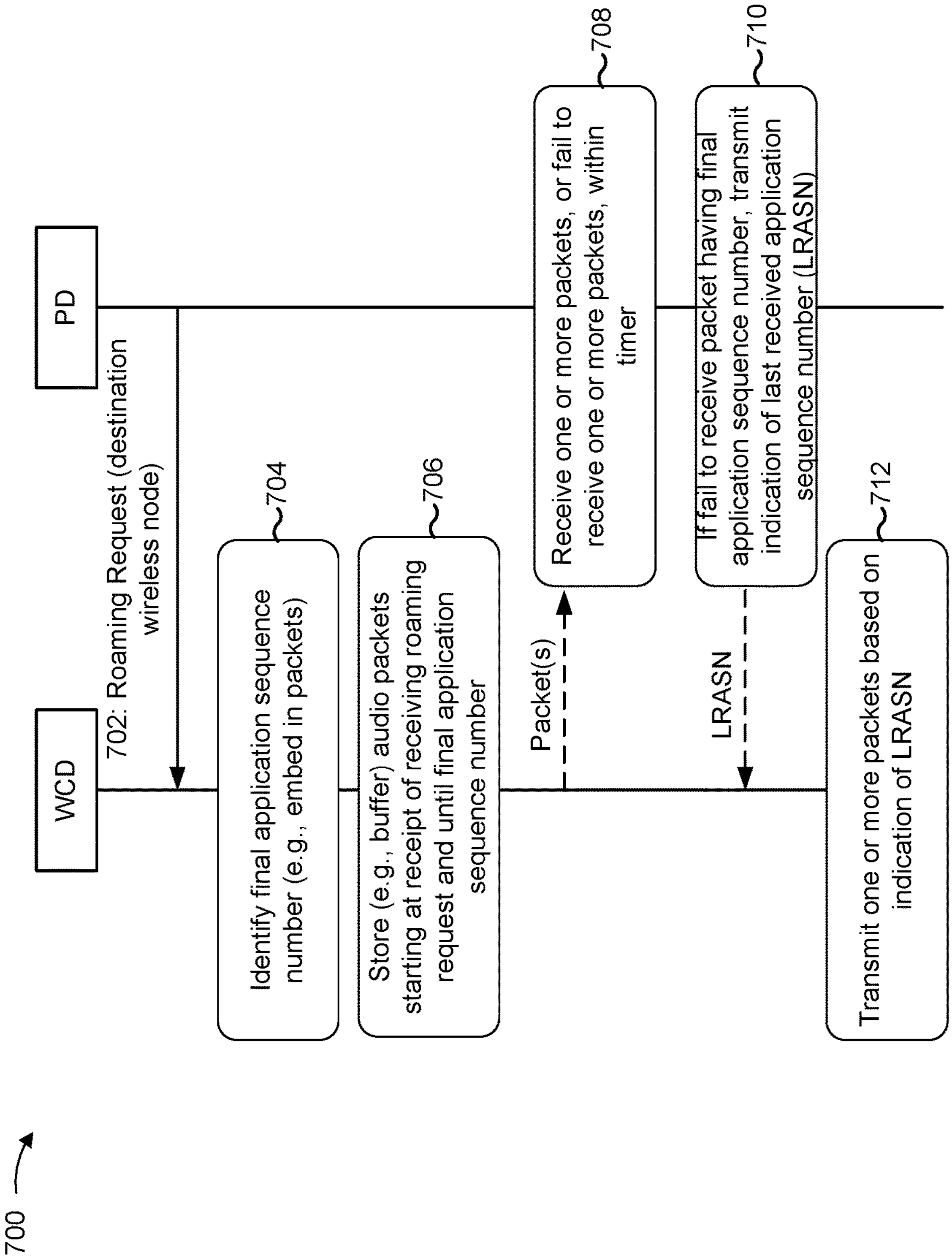
FIG. 7 is a diagram illustrating an example of indication of a final application sequence number of a set of packets, in accordance with the present disclosure.

FIG. 7 is a diagram illustrating an example 700 of indication of a final application sequence number of a set of packets, in accordance with the present disclosure. Example 700 includes a wireless communication device (e.g., wireless communication device 102) and a peripheral device (e.g., peripheral device 104, 106, 108, 110, 112, 114).

As shown in FIG. 7, and by reference number 702, the peripheral device may transmit, and the wireless communication device may receive, a request indicating a destination wireless node. For example, the peripheral device may transmit a roaming request. The request may indicate an intent to roam to a destination wireless node, such as a destination AP. For example, the request may indicate that the peripheral device is to transition from communicating with the wireless communication device via a source wireless node (or group of source wireless nodes) to communicating with the wireless communication device via a destination wireless node (or group of destination wireless nodes). In some aspects, the peripheral device may transmit the request via a direct link with the wireless communication device (such as a Wi-Fi link or a BLE link). In some aspects, the peripheral device may transmit the request via an AP, which may forward the request to the wireless communication device.

As shown by reference number 704, the wireless communication device may identify a final application sequence number (sometimes referred to as a last sequence number (LSN)). For example, the wireless communication device may include (e.g., embed) information identifying the final application sequence number in one or more packets. The final application sequence number may indicate a final packet that is to be transmitted on a link including the source wireless node (e.g., a link to a current serving AP or handset), before the wireless communication device and the peripheral device transition to communicating via the destination wireless node. In some aspects, an application layer entity such as a codec of the wireless communication device (e.g., encoder 412) may identify the final application sequence number. For example, the codec may insert the final application sequence number in one or more packets (e.g., audio data packets). In some aspects, the final application sequence number may be an audio sequence number. Application sequence numbers may be distinct from medium access control (MAC)-layer sequence numbers, which may be used for reordering or identification of missed packets at the MAC or physical layer. Application sequence numbering may be beneficial because audio data is generated at the application layer of the source device and rendered at the application layer of the sink device. A MAC layer sequence number may not directly map to an audio packet. For example, multiple audio packets (at the application layer) may map to a single MAC layer sequence number or vice versa.

In some aspects, the wireless communication device may determine the final application sequence number. For example, the wireless communication device may calculate a length of time involved in setting up a peer-to-peer link (referred to as a link setup time) with the peripheral device (in the case of an AP-to-handset transition), a length of time associated with an end-to-end latency from the wireless communication device to the peripheral device, or another length of time associated with the transition. The wireless communication device may estimate the final application sequence number based on a current application sequence number and an amount of data queued at the wireless communication device. In some aspects, the wireless communication device may minimize a difference between the current application sequence number and the final application sequence number, which may reduce the number of packets sent on the (weaker) connection via the source wireless node and which may reduce memory usage at the wireless communication device for buffering packets sent on the connection via the source wireless node.

In some aspects, the wireless communication device may transmit an indication of the final application sequence number. For example, the wireless communication device may transmit a packet that includes a field that identifies the final application sequence number. As another example, the wireless communication device may transmit a message identifying the final application sequence number. As another example, the wireless communication device may transmit a packet that includes a binary field, where a first value in the binary field indicates that the packet does not have the final application sequence number and a second value in the binary field indicates that the packet has the final application sequence number.

As shown by reference number 706, the wireless communication device may store packets starting when the request shown by reference number 702 is received and until the final application sequence number is reached. For example, the wireless communication device may buffer audio packets, associated with a connection between the wireless communication device and the peripheral device and including the source wireless node, starting when the request is received. The wireless communication device may buffer packets (and continue transmitting the packets) having application sequence numbers until the final application sequence number is reached.

As shown by reference number 708, the peripheral device may receive one or more packets transmitted by the wireless communication device. In some examples, the peripheral device may receive one or more packets via the source wireless node after transmitting the request shown by reference number 702, and before reaching the final application sequence number. In some examples, the peripheral device may fail to receive one or more packets. For example, the peripheral device may transmit the request based on moving out of a coverage area of a source wireless node, so it may be expected that a degraded link quality leads to one or more missed packets. As further shown, the peripheral device may wait to receive a packet having the final application sequence number until expiration of a timer at the peripheral device (e.g., a timer max_wait_time_on_current_AP). In some examples, the peripheral device may receive a packet having the final application sequence number before expiration of the timer. In this case, the peripheral device may perform the transition to the destination wireless node without triggering retransmission of packets in association with missing the packet having the final application sequence number.

The timer may be configurable. For example, the wireless communication device may configure a length of the timer for the peripheral device. As another example, a wireless communication specification may indicate the length of the timer. As another example, the length of the timer may be based on one or more parameters of a connection between the wireless communication device and the peripheral device, or one or more parameters of a connection between the peripheral device and the source wireless node.

As shown by reference number 710, if the peripheral device fails to receive a packet having the final application sequence number (e.g., due to poor link quality with the source wireless node), the peripheral device may transmit, and the wireless communication device may receive, an indication of a last received application sequence number of a set of packets. For example, the peripheral device may transmit a control message, over a connection via the destination wireless node, that indicates the last received application sequence number. The set of packets may include one or more packets communicated between transmission of the request shown by reference number 702 and a packet associated with the final application sequence number. The peripheral device may transition to a connection via or to the destination wireless node irrespective of whether the peripheral device fails to receive the packet having the final application sequence number. In some aspects, the peripheral device may transmit the indication of the last received application sequence number via GATT over TCP (such as for WHC through one or more APs), GATT over LE (such as for a direct connection with the wireless communication device over BLE), or via an action frame (e.g., a vendor-specific action frame for direct connection to the wireless communication device using XPAN).

As shown by reference number 712, the wireless communication device may transmit (e.g., retransmit) one or more packets based on the indication of the last received application sequence number. For example, the wireless communication device may transmit any packet having an application sequence number above the last received application sequence number and equal to or below the final application sequence number, via the destination wireless node. Thus, the wireless communication device may reduce or eliminate the occurrence of lost data in association with transitioning wireless nodes, as may occur when WHC is active.

As an example, the wireless communication device may transmit a packet via the source wireless node having an application sequence number of 1. After receiving this packet, the peripheral device may transmit a request (e.g., roaming request) indicating a transition to a destination wireless node, shown by reference number 702. The wireless communication device may identify a final application sequence number of 5, shown by reference numbers 704. The wireless communication device may store and transmit packets having application sequence numbers of 2, 3, 4, and 5 via the source wireless node, shown by reference number 708. The peripheral device may fail to receive the packets having the application sequence numbers of 4 and 5 within the length of the timer, for example, due to degraded link quality. Thus, the peripheral device may transmit an indication of a last received application sequence number of 3, shown by reference number 710. The wireless communication device may retransmit the packets having the application sequence numbers of 4 and 5 (e.g., in response to the indication of the last received application sequence number), as shown by reference number 712.

As indicated above, FIG. 7 is provided as an example. Other examples may differ from what is provided with regard to FIG. 7.

Figure 8:
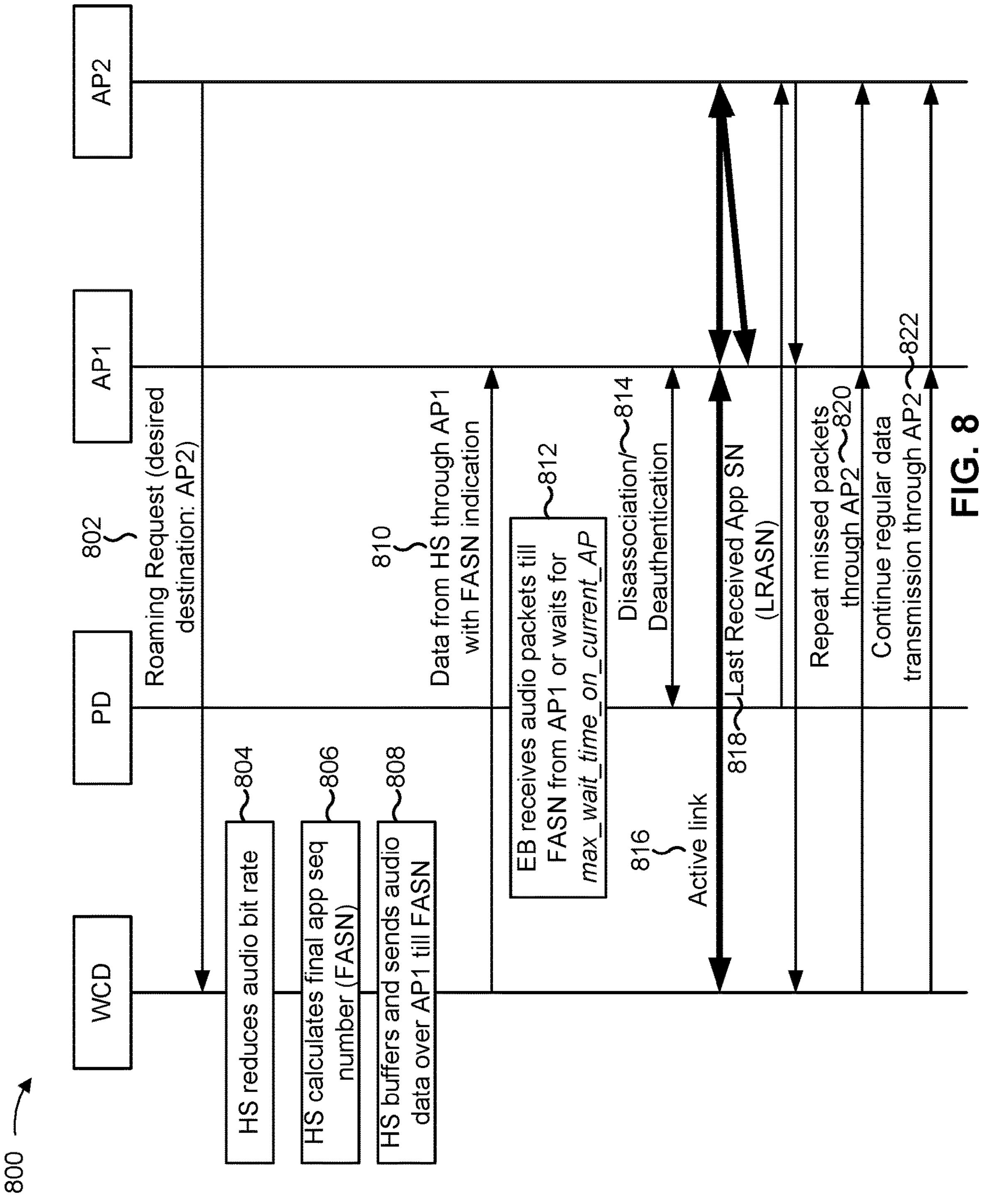
FIG. 8 is a diagram illustrating an example of signaling associated with indication of a final application sequence number of a set of packets, in accordance with the present disclosure.
Figure 9:
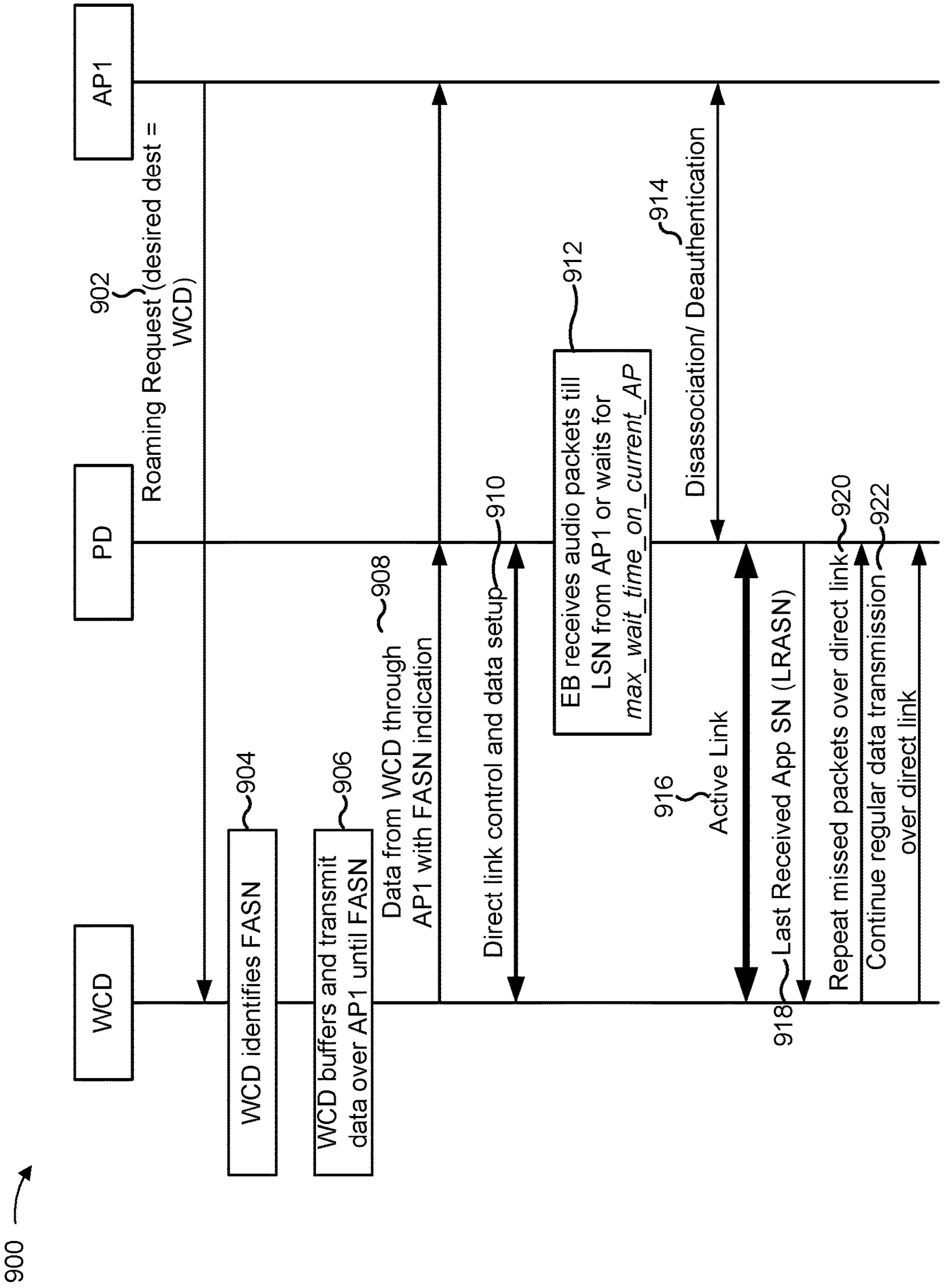
FIG. 9 is a diagram illustrating another example of signaling associated with indication of a final application sequence number of a set of packets, in accordance with the present disclosure.
Figure 10:
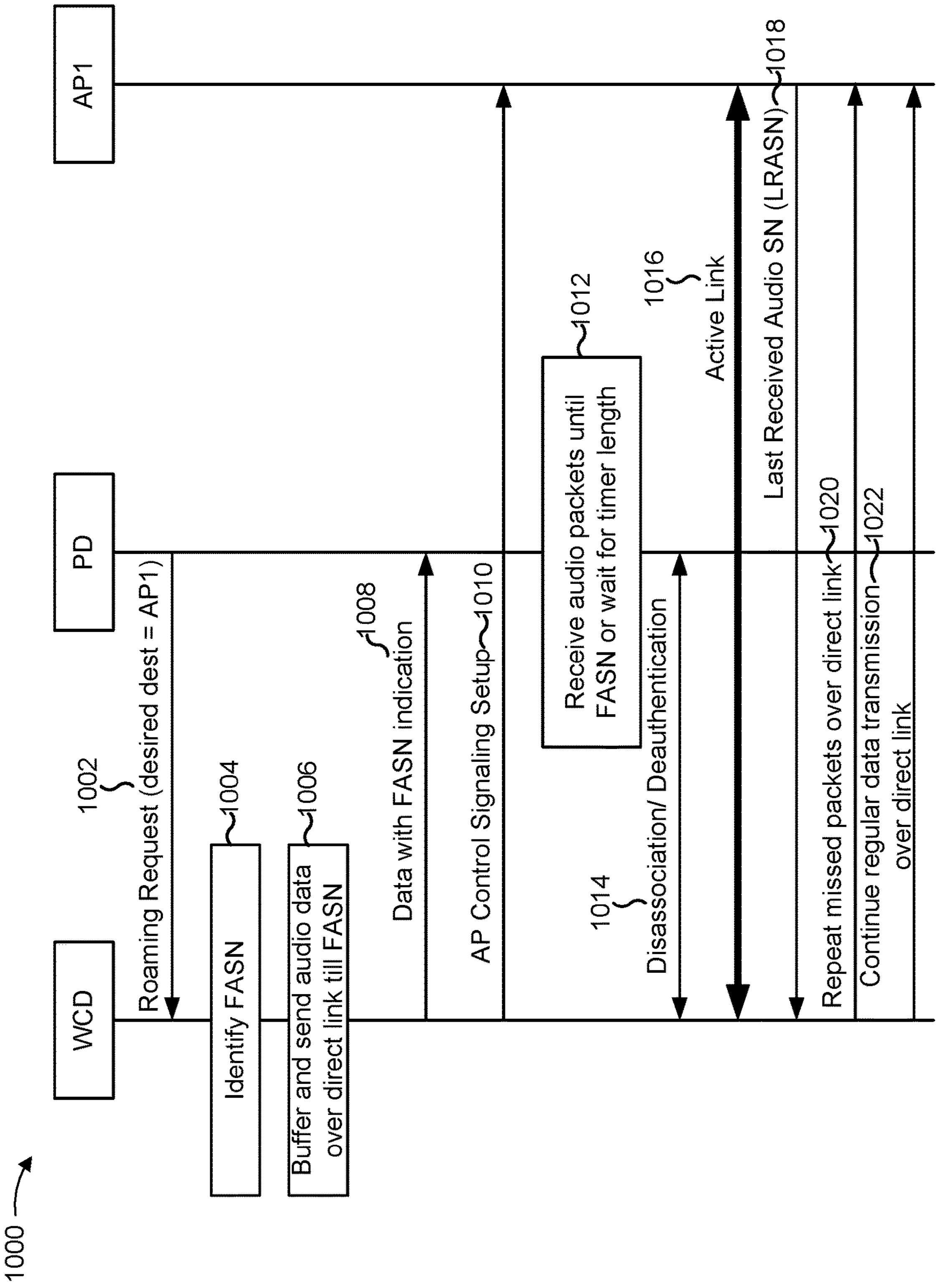
FIG. 10 is a diagram illustrating an example of signaling associated with indication of a final application sequence number of a set of packets, in accordance with the present disclosure.

FIGS. 8-10 provide examples of the operations of FIG. 7 for different topologies of wireless communication device, peripheral device, and wireless node. Topologies are described with regard to FIG. 6.

FIG. 8 is a diagram illustrating an example 800 of signaling associated with indication of a final application sequence number of a set of packets, in accordance with the present disclosure. Example 800 includes a wireless communication device (WCD) (e.g., wireless communication device 102, the wireless communication device of FIG. 7), a peripheral device (PD) (e.g., peripheral device 104, 106, 108, 110, 112, or 114), a first AP (AP1) (e.g., a source wireless node), and a second AP (AP2) (e.g., a destination wireless node). In example 800, a connection of the peripheral device is transitioning from a first AP as the source wireless node to a second AP as the destination wireless node. Example 800 may be referred to as an AP-to-AP graceful transition. In example 800, the wireless communication device and the peripheral device may have a connection via the first AP.

As shown by reference number 802, the peripheral device may transmit (e.g., via the source wireless node to the wireless communication device), and the wireless communication device may receive, a roaming request (described in connection with reference number 702). The roaming request may indicate the second AP. For example, the peripheral device may transmit the roaming request based at least in part on determining that a connection with the second AP is expected to provide a better link performance than a connection with the first AP. As another example, the peripheral device may transmit the roaming request based at least in part on a link quality associated with the first AP being lower than a threshold.

As shown by reference number 804, in some aspects, the wireless communication device may reduce a bit rate of a communication. For example, the wireless communication device may reduce an audio bit rate of a communication between the wireless communication device and the peripheral device based at least in part on the roaming request, which may account for a larger expected end-to-end latency due to additional hops at one or more APs. As shown by reference number 806, the wireless communication device may identify (e.g., calculate and/or signal) a final application sequence number, as described with regard to reference number 704 of FIG. 7. As shown by reference number 808, the wireless communication device may buffer and transmit data (e.g., audio data) to the peripheral device via the first AP until reaching the final application sequence number, as described with regard to reference number 706 of FIG. 7. For example, as shown by reference number 810, the transmitted data may include an indication of the final application sequence number.

As shown by reference number 812, the peripheral device may receive audio packets from the wireless communication device until a packet with the final application sequence number is received via the first AP, or until a timer at the peripheral device has expired, as described with regard to reference number 708 of FIG. 7. As shown by reference number 814, the peripheral device may perform disassociation or de-authentication with the first AP. As shown by reference number 816, the peripheral device may transition to the second AP as the destination wireless node. For example, the peripheral device and the wireless communication device may reconfigure a connection such that communications on the connection are via the destination wireless node.

As shown by reference number 818, the peripheral device may transmit, to the wireless communication device via the second AP, an indication of a last received application sequence number, as described with regard to reference number 710 of FIG. 7. For example, the peripheral device may transmit the indication if the peripheral device does not receive a packet with the final application sequence number within the timer. As shown by reference number 820, the wireless communication device may repeat transmission of one or more packets, such as one or more packets with application sequence numbers between the last received application sequence number and the final application sequence number, via the second AP, as described with regard to reference number 712 of FIG. 7. As shown by reference number 822, the wireless communication device may continue regular data transmission to the peripheral device via the second AP.

As indicated above, FIG. 8 is provided as an example. Other examples may differ from what is provided with regard to FIG. 8.

FIG. 9 is a diagram illustrating another example 900 of signaling associated with indication of a final application sequence number of a set of packets, in accordance with the present disclosure. Example 900 includes a wireless communication device (e.g., wireless communication device 102, the wireless communication device of FIG. 7), a peripheral device (e.g., peripheral device 104, 106, 108, 110, 112, or 114), and an AP (e.g., a source wireless node). FIG. 9 shows an example 900 in which the peripheral device is transitioning from an AP as the source wireless node to the wireless communication device as the destination wireless node. Example 900 may be referred to as an AP-to-handset graceful transition. In example 900, the wireless communication device and the peripheral device may initially have a connection via the first AP.

As shown by reference number 902, the peripheral device may transmit (e.g., via the source wireless node to the wireless communication device), and the wireless communication device may receive, a roaming request (described in connection with reference number 702). The roaming request may indicate the wireless communication device as a destination wireless node. For example, the peripheral device may transmit the roaming request based at least in part on determining that a connection with the wireless communication device is expected to provide a better link performance than a connection with the first AP. As another example, the peripheral device may transmit the roaming request based at least in part on a link quality associated with the AP being lower than a threshold.

As shown by reference number 904, the wireless communication device may identify (e.g., calculate and/or signal) a final application sequence number, as described with regard to reference number 704 of FIG. 7. As shown by reference number 906, the wireless communication device may buffer and transmit data (e.g., audio data) to the peripheral device via the AP until reaching the final application sequence number, as described with regard to reference number 706 of FIG. 7. For example, as shown by reference number 908, the transmitted data may include an indication of the final application sequence number. As shown by reference number 910, the wireless communication device and the peripheral device may perform direct link control and data setup, which may include configuring control signaling and data transmission via a direct link (e.g., an XPAN direct link) between the wireless communication device and the peripheral device.

As shown by reference number 912, the peripheral device may receive audio packets from the wireless communication device until a packet with the final application sequence number is received via the AP, or until a timer at the peripheral device has expired, as described with regard to reference number 708 of FIG. 7. As shown by reference number 914, the peripheral device may perform disassociation or de-authentication with the AP. As shown by reference number 916, the peripheral device may transition to the wireless communication device as the destination wireless node.

As shown by reference number 918, the peripheral device may transmit, to the wireless communication device, an indication of a last received application sequence number, as described with regard to reference number 710 of FIG. 7. For example, the peripheral device may transmit the indication if the peripheral device does not receive a packet with the final application sequence number within the timer. As shown by reference number 920, the wireless communication device may repeat transmission of one or more packets, such as one or more packets with application sequence numbers between the last received application sequence number and the final application sequence number, as described with regard to reference number 712 of FIG. 7. As shown by reference number 922, the wireless communication device may continue regular data transmission to the peripheral device.

As indicated above, FIG. 9 is provided as an example. Other examples may differ from what is provided with regard to FIG. 9.

FIG. 10 is a diagram illustrating an example 1000 of signaling associated with indication of a final application sequence number of a set of packets, in accordance with the present disclosure. Example 1000 includes a wireless communication device (e.g., wireless communication device 102, the wireless communication device of FIG. 7), a peripheral device (e.g., peripheral device 104, 106, 108, 110, 112, or 114), and an AP (e.g., a destination wireless node).

FIG. 10 shows an example 1000 in which the peripheral device is transitioning from the wireless communication device as a source wireless node to an AP as the destination wireless node. Example 1000 may be referred to as a handset-to-AP graceful transition. In example 1000, the wireless communication device and the peripheral device may initially have a connection with one another (e.g., without an intermediary wireless node).

As shown by reference number 1002, the peripheral device may transmit, and the wireless communication device may receive, a roaming request (described in connection with reference number 702). The roaming request may indicate the AP as a destination wireless node. For example, the peripheral device may transmit the roaming request based at least in part on determining that a connection with the wireless communication device via the AP is expected to provide a better link performance than a connection with the wireless communication device (e.g., without the AP as an intermediary wireless node). As another example, the peripheral device may transmit the roaming request based at least in part on a link quality associated with the wireless communication device being lower than a threshold.

As shown by reference number 1004, the wireless communication device may identify (e.g., calculate and/or signal) a final application sequence number, as described with regard to reference number 704 of FIG. 7. As shown by reference number 1006, the wireless communication device may buffer and transmit data (e.g., audio data) to the peripheral device until reaching the final application sequence number, as described with regard to reference number 706 of FIG. 7. For example, as shown by reference number 1008, the transmitted data may include an indication of the final application sequence number. As shown by reference number 1010, the peripheral device may configure control signaling to occur via the AP.

As shown by reference number 1012, the peripheral device may receive audio packets from the wireless communication device until a packet with the final application sequence number is received, or until a timer at the peripheral device has expired, as described with regard to reference number 708 of FIG. 7. As shown by reference number 1014, the peripheral device may perform disassociation or deauthentication with the wireless communication device. As shown by reference number 1016, the peripheral device may transition to the AP as the destination wireless node.

As shown by reference number 1018, the peripheral device may transmit, to the wireless communication device via the AP, an indication of a last received application sequence number, as described with regard to reference number 710 of FIG. 7. For example, the peripheral device may transmit the indication if the peripheral device does not receive a packet with the final application sequence number within the timer. As shown by reference number 1020, the wireless communication device may repeat transmission of one or more packets via the AP, such as one or more packets with application sequence numbers between the last received application sequence number and the final application sequence number, as described with regard to reference number 712 of FIG. 7. As shown by reference number 1022, the wireless communication device may continue regular data transmission to the peripheral device via the AP.

As indicated above, FIG. 10 is provided as an example. Other examples may differ from what is provided with regard to FIG. 10.

Figure 11:
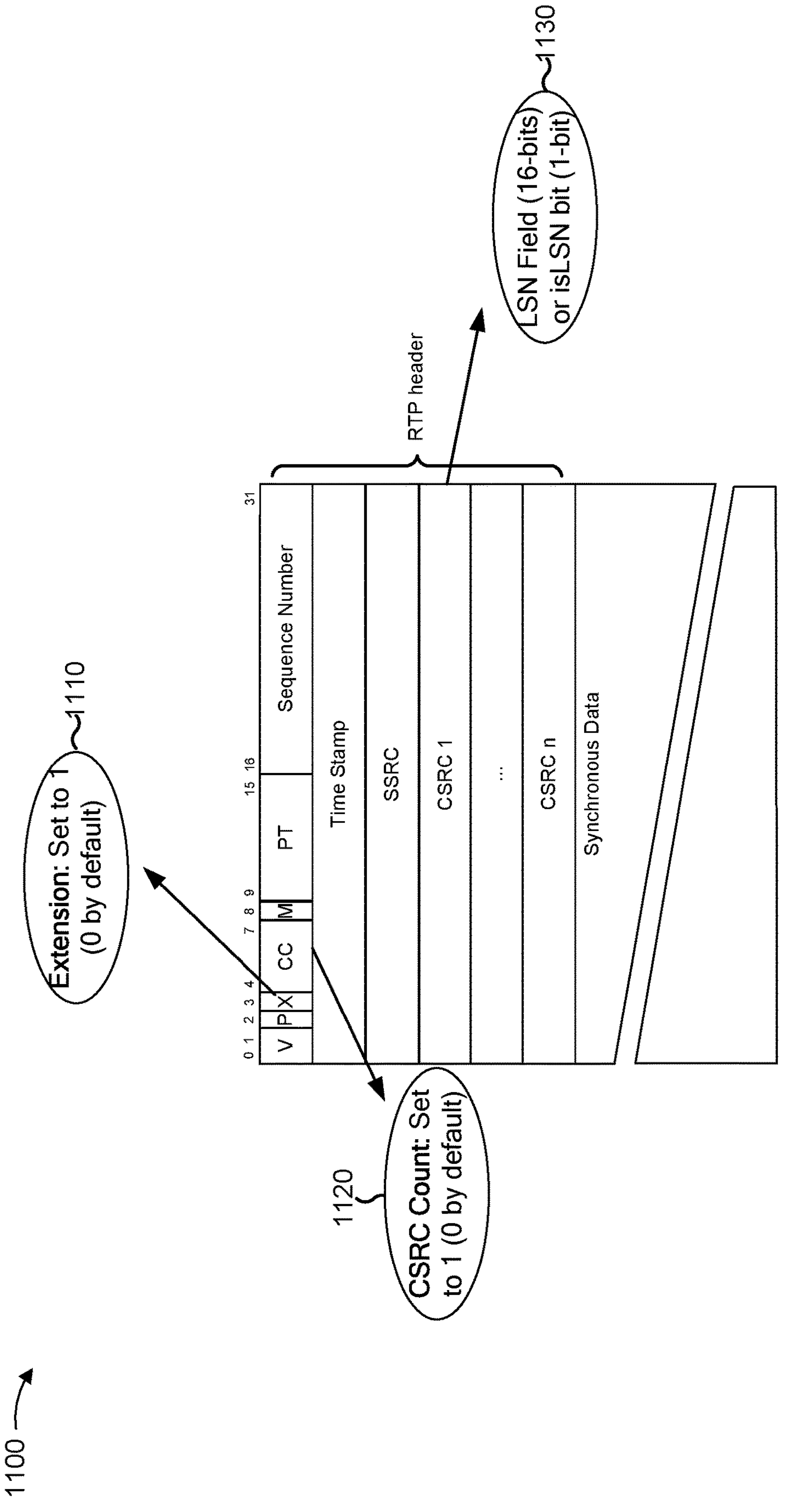
FIG. 11 is a diagram illustrating an example of a header of a packet indicating a final application sequence number, in accordance with the present disclosure.

FIG. 11 is a diagram illustrating an example 1100 of a header of a packet indicating a final application sequence number, in accordance with the present disclosure. The header may include a real-time transport (RTP) header. As shown by reference number 1110, an extension field of the header may be set to 1 to indicate that one or more optional fields, such as one or more contributing source (CSRC) fields, are present in the header. As shown by reference number 1120, a CSRC count field may be set to 1 to indicate a number of CSRC fields present in the message. As shown by reference number 1130, a field (e.g., a CSRC field) may include an indication of a final application sequence number. In some aspects, the indication may comprise a value of a field (e.g., a 16-bit field) that is included in the CSRC field. The value may explicitly indicate the final application sequence number. Explicitly indicating the final application sequence number may reduce communication and processing overhead relative to transmitting a bit in each packet indicating whether each packet has the final application sequence number. In some aspects, the indication may comprise a bit indicating whether a packet, to which the header is attached, has the final application sequence number (e.g., whether the packet is a last packet to be transmitted via or by a source wireless node), which may reduce overhead of a single packet relative to the single packet explicitly indicating the final application sequence number.

As indicated above, FIG. 11 is provided as an example. Other examples may differ from what is provided with regard to FIG. 11.

Figure 12:
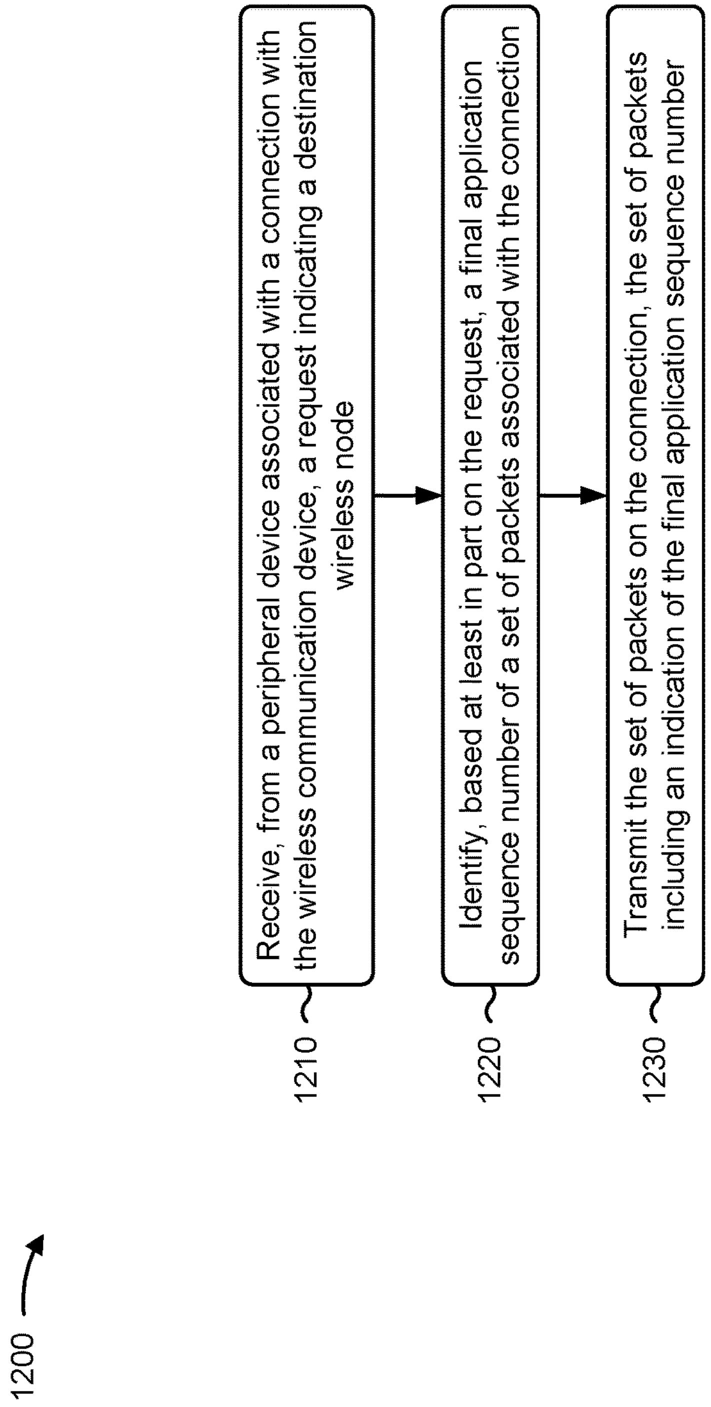
FIG. 12 is a diagram illustrating an example process performed, for example, by a wireless communication device or an apparatus of a wireless communication device, in accordance with the present disclosure.

FIG. 12 is a diagram illustrating an example process 1200 performed, for example, by a wireless communication device or an apparatus of a wireless communication device, in accordance with the present disclosure. Example process 1200 is an example where the wireless communication device (e.g., wireless communication device 102, wireless communication device 200, source device 410, wireless communication device 500, the wireless communication device of FIGS. 7-11) performs operations associated with whole home connectivity transition. Where the process 1200 is performed by the apparatus of the wireless communication device, the apparatus may cause the wireless communication device to perform operations of the process 1200.

As shown in FIG. 12, in some aspects, process 1200 may include receiving, from a peripheral device associated with a connection with the wireless communication device, a request indicating a destination wireless node (block 1210). For example, the wireless communication device (e.g., using reception component 1402 and/or communication manager 1406, depicted in FIG. 14) may receive, from a peripheral device associated with a connection with the wireless communication device, a request indicating a destination wireless node, as described above.

As further shown in FIG. 12, in some aspects, process 1200 may include identifying, based at least in part on the request, a final application sequence number of a set of packets associated with the connection (block 1220). For example, the wireless communication device (e.g., using communication manager 1406, depicted in FIG. 14) may identify, based at least in part on the request, a final application sequence number of a set of packets associated with the connection, as described above.

As further shown in FIG. 12, in some aspects, process 1200 may include transmitting the set of packets on the connection, the set of packets including an indication of the final application sequence number (block 1230). For example, the wireless communication device (e.g., using transmission component 1404 and/or communication manager 1406, depicted in FIG. 14) may transmit the set of packets on the connection, the set of packets including an indication of the final application sequence number, as described above.

Process 1200 may include additional aspects, such as any single aspect or any combination of aspects described below and/or in connection with one or more other processes described elsewhere herein.

In a first aspect, process 1200 includes receiving, from the peripheral device, an indication of a last received application sequence number of the set of packets, and transmitting one or more packets associated with one or more sequence numbers occurring between the last received application sequence number and the final application sequence number.

In a second aspect, alone or in combination with the first aspect, transmitting the one or more packets further comprises transmitting the one or more packets via the destination wireless node.

In a third aspect, alone or in combination with one or more of the first and second aspects, receiving the indication of the last received application sequence number is based at least in part on a timer at the peripheral device.

In a fourth aspect, alone or in combination with one or more of the first through third aspects, receiving the indication of the last received application sequence number further comprises receiving the indication of the last received application sequence number based at least in part on at least one of a generic attribute over transmission control protocol, a generic attribute over low-energy, or an action frame.

In a fifth aspect, alone or in combination with one or more of the first through fourth aspects, receiving the request further comprises receiving the request via a source wireless node, and wherein transmitting the set of packets further comprises transmitting the set of packets via the source wireless node.

In a sixth aspect, alone or in combination with one or more of the first through fifth aspects, identifying the final application sequence number further comprises identifying the final application sequence number at an application layer of the wireless communication device.

In a seventh aspect, alone or in combination with one or more of the first through sixth aspects, identifying the final application sequence number further comprises identifying the final application sequence number based at least in part on at least one of a data queue, or a current application sequence number.

In an eighth aspect, alone or in combination with one or more of the first through seventh aspects, identifying the final application sequence number further comprises identifying the final application sequence number based at least in part on at least one of a bit rate associated with the connection, or a link setup time.

In a ninth aspect, alone or in combination with one or more of the first through eighth aspects, the final application sequence number indicates a last packet, of the set of packets, to be transmitted via a source wireless node of the connection.

In a tenth aspect, alone or in combination with one or more of the first through ninth aspects, the destination wireless node is the wireless communication device. For example, the source wireless node may be an access point and the destination wireless node may be the wireless communication device.

In an eleventh aspect, alone or in combination with one or more of the first through tenth aspects, the destination wireless node is an access point. For example, the source wireless node may be a wireless communication device and the destination wireless node may be the access point.

In a twelfth aspect, alone or in combination with one or more of the first through eleventh aspects, the indication of the final application sequence number comprises at least one of a sequence number, or a bit indicating whether a corresponding packet is associated with the final application sequence number.

In a thirteenth aspect, alone or in combination with one or more of the first through twelfth aspects, the indication of the final application sequence number is included in a contributing source field of a header.

In a fourteenth aspect, alone or in combination with one or more of the first through thirteenth aspects, the set of packets are associated with a medium access control layer sequence number separate from the final application sequence number.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
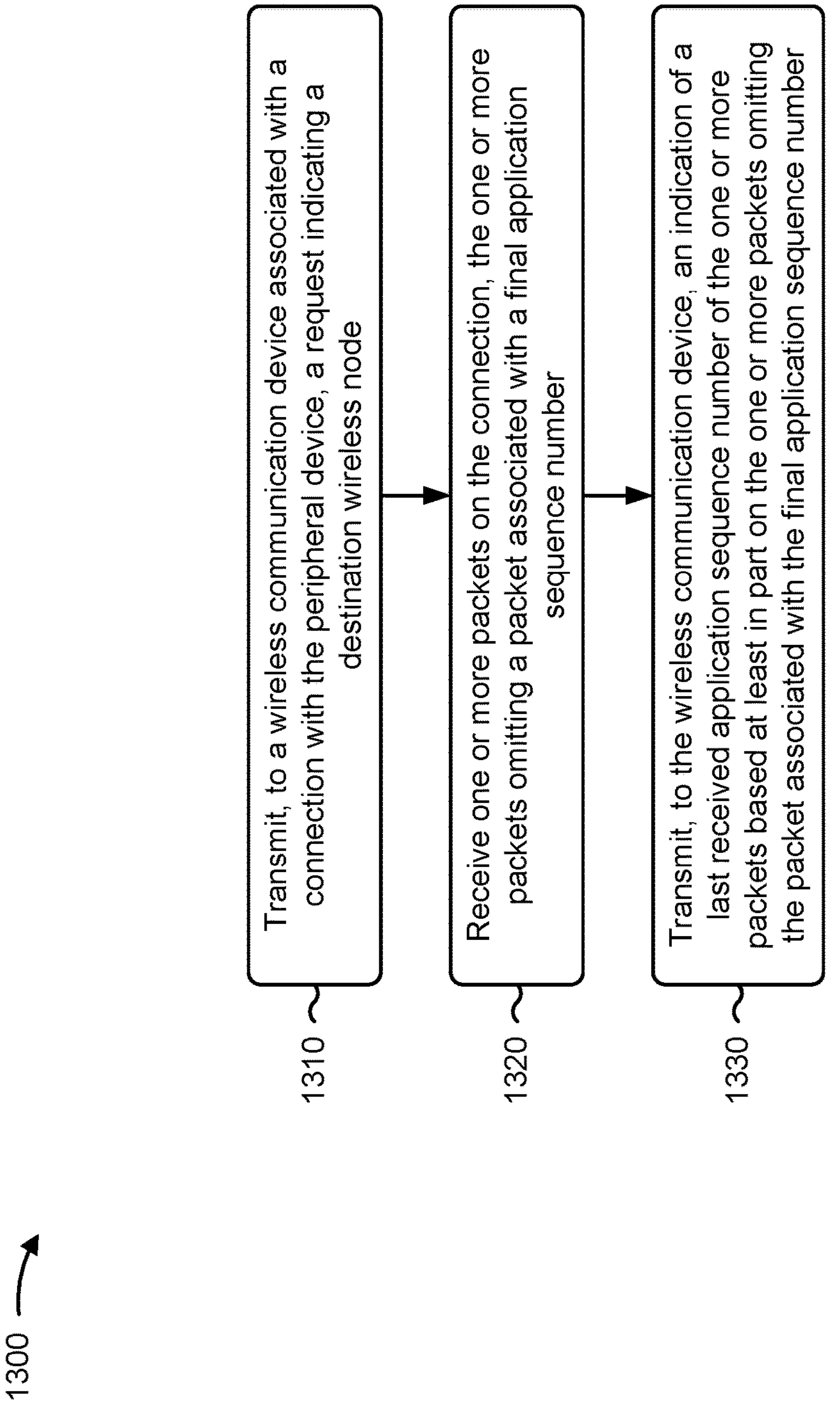
FIG. 13 is a diagram illustrating an example process performed, for example, by a peripheral device, in accordance with the present disclosure.

FIG. 13 is a diagram illustrating an example process 1300 performed, for example, by a peripheral device, in accordance with the present disclosure. Example process 1300 is an example where the peripheral device (e.g., peripheral device 104, 106, 108, 110, 112, the sink device 420, the peripheral device of FIGS. 7-11) performs operations associated with whole home connectivity transition.

As shown in FIG. 13, in some aspects, process 1300 may include transmitting, to a wireless communication device associated with a connection with the peripheral device, a request indicating a destination wireless node (block 1310). For example, the peripheral device (e.g., using transmission component 1504 and/or communication manager 1506, depicted in FIG. 15) may transmit, to a wireless communication device associated with a connection with the peripheral device, a request indicating a destination wireless node, as described above.

As further shown in FIG. 13, in some aspects, process 1300 may include receiving one or more packets on the connection, the one or more packets omitting a packet associated with a final application sequence number (block 1320). For example, the peripheral device (e.g., using reception component 1502 and/or communication manager 1506, depicted in FIG. 15) may receive one or more packets on the connection, the one or more packets omitting a packet associated with a final application sequence number, as described above.

As further shown in FIG. 13, in some aspects, process 1300 may include transmitting, to the wireless communication device, an indication of a last received application sequence number of the one or more packets based at least in part on the one or more packets omitting the packet associated with the final application sequence number (block 1330). For example, the peripheral device (e.g., using transmission component 1504 and/or communication manager 1506, depicted in FIG. 15) may transmit, to the wireless communication device, an indication of a last received application sequence number of the one or more packets based at least in part on the one or more packets omitting the packet associated with the final application sequence number, as described above.

Process 1300 may include additional aspects, such as any single aspect or any combination of aspects described below and/or in connection with one or more other processes described elsewhere herein.

In a first aspect, process 1300 includes receiving a set of packets associated with one or more sequence numbers occurring between the last received application sequence number and the final application sequence number.

In a second aspect, alone or in combination with the first aspect, receiving the set of packets further comprises receiving the set of packets via the destination wireless node.

In a third aspect, alone or in combination with one or more of the first and second aspects, transmitting the indication of the last received application sequence number is based at least in part on a timer at the peripheral device expiring without having received the packet associated with the final application sequence number.

In a fourth aspect, alone or in combination with one or more of the first through third aspects, transmitting the indication of the last received application sequence number further comprises transmitting the indication of the last received application sequence number based at least in part on at least one of a generic attribute over transmission control protocol, a generic attribute over low-energy, or an action frame.

In a fifth aspect, alone or in combination with one or more of the first through fourth aspects, transmitting the request further comprises transmitting the request via a source wireless node, and wherein receiving the one or more packets further comprises receiving the one or more packets via the source wireless node.

In a sixth aspect, alone or in combination with one or more of the first through fifth aspects, the final application sequence number indicates that the packet is a last packet, of the one or more packets, to be transmitted via a source wireless node of the connection.

In a seventh aspect, alone or in combination with one or more of the first through sixth aspects, the destination wireless node is the wireless communication device.

In an eighth aspect, alone or in combination with one or more of the first through seventh aspects, the destination wireless node is an access point.

In a ninth aspect, alone or in combination with one or more of the first through eighth aspects, process 1300 includes receiving an indication of the final application sequence number comprising at least one of a sequence number, or a bit indicating whether a corresponding packet is associated with the final application sequence number.

In a tenth aspect, alone or in combination with one or more of the first through ninth aspects, the indication of the final application sequence number is included in a contributing source field of a header.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
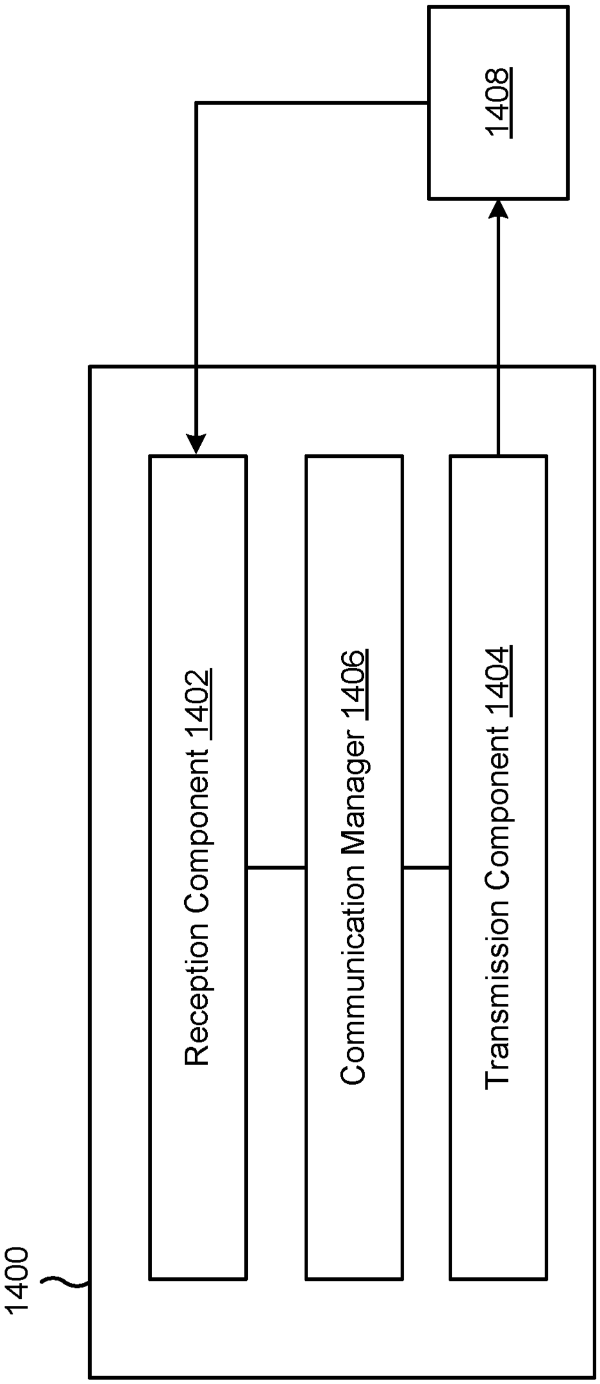
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a wireless communication device, or a wireless communication device may include the apparatus 1400. In some aspects, the apparatus 1400 includes a reception component 1402, a transmission component 1404, and/or a communication manager 1406, which may be in communication with one another (for example, via one or more buses and/or one or more other components). As shown, the apparatus 1400 may communicate with another apparatus 1408, such as a peripheral device or an AP, using the reception component 1402 and the transmission component 1404.

In some aspects, the apparatus 1400 may be configured to perform one or more operations described herein in connection with FIGS. 1-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the wireless communication device described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more components or protocol entities of the wireless communication device or the source device described with regard to FIGS. 1-5.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more components or protocol entities of the wireless communication device or the source device described with regard to FIGS. 1-5.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The reception component 1402 may receive, from a peripheral device associated with a connection with the wireless communication device, a request indicating a destination wireless node. The communication manager 1406 may identify, based at least in part on the request, a final application sequence number of a set of packets associated with the connection. The transmission component 1404 may transmit the set of packets on the connection, the set of packets including an indication of the final application sequence number.

The reception component 1402 may receive, from the peripheral device, an indication of a last received application sequence number of the set of packets.

The transmission component 1404 may transmit one or more packets associated with one or more sequence numbers occurring between the last received application sequence number and the final application sequence number.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
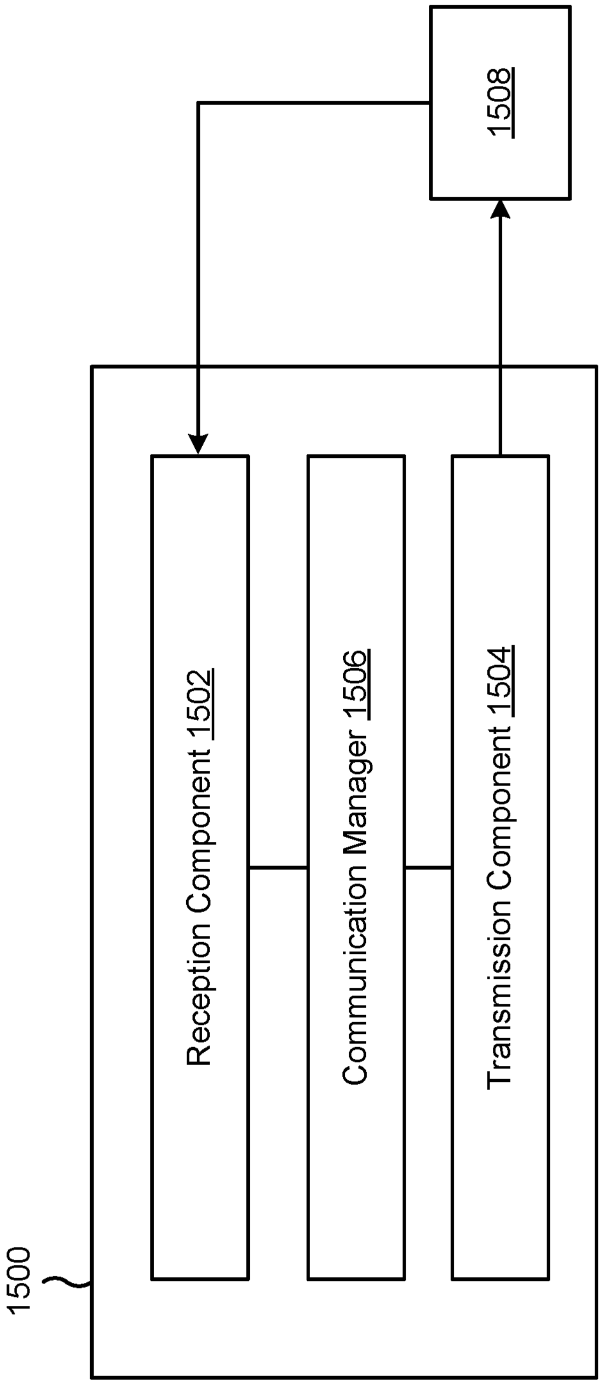
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a peripheral device, or a peripheral device may include the apparatus 1500. In some aspects, the apparatus 1500 includes a reception component 1502, a transmission component 1504, and/or a communication manager 1506, which may be in communication with one another (for example, via one or more buses and/or one or more other components). As shown, the apparatus 1500 may communicate with another apparatus 1508, such as wireless communication device or a wireless node, using the reception component 1502 and the transmission component 1504.

In some aspects, the apparatus 1500 may be configured to perform one or more operations described herein in connection with FIGS. 1-11. Additionally, or alternatively, the apparatus 1500 may be configured to perform one or more processes described herein, such as process 1300 of FIG. 13, or a combination thereof. In some aspects, one or more components of the apparatus 1500 may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a multiple-input multiple-output (MIMO) detector, a receive processor, a controller/processor, one or more memories, a Wi-Fi interface, a Bluetooth interface such as a BLE interface, or a combination thereof.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/processor, one or more memories, a Wi-Fi interface, a Bluetooth interface such as a BLE interface, or a combination thereof. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

The transmission component 1504 may transmit, to a wireless communication device associated with a connection with the peripheral device, a request indicating a destination wireless node. The reception component 1502 may receive one or more packets on the connection, the one or more packets omitting a packet associated with a final application sequence number. The transmission component 1504 may transmit, to the wireless communication device, an indication of a last received application sequence number of the one or more packets based at least in part on the one or more packets omitting the packet associated with the final application sequence number.

The reception component 1502 may receive a set of packets associated with one or more sequence numbers occurring between the last received application sequence number and the final application sequence number.

The reception component 1502 may receive an indication of the final application sequence number comprising at least one of a sequence number, or a bit indicating whether a corresponding packet is associated with the final application sequence number.

The number and arrangement of components shown in FIG. 15 are provided as an example. In practice, there may be additional components, fewer components, different components, or differently arranged components than those shown in FIG. 15.

Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a wireless communication device, comprising: receiving, from a peripheral device associated with a connection with the wireless communication device, a request indicating a destination wireless node; identifying, based at least in part on the request, a final application sequence number of a set of packets associated with the connection; and transmitting the set of packets on the connection, the set of packets including an indication of the final application sequence number.

Aspect 2: The method of Aspect 1, further comprising: receiving, from the peripheral device, an indication of a last received application sequence number of the set of packets; and transmitting one or more packets associated with one or more sequence numbers occurring between the last received application sequence number and the final application sequence number.

Aspect 3: The method of Aspect 2, wherein transmitting the one or more packets further comprises transmitting the one or more packets via the destination wireless node.

Aspect 4: The method of Aspect 2, wherein receiving the indication of the last received application sequence number is based at least in part on a timer at the peripheral device.

Aspect 5: The method of Aspect 2, wherein receiving the indication of the last received application sequence number further comprises receiving the indication of the last received application sequence number based at least in part on at least one of: a generic attribute over transmission control protocol, a generic attribute over low-energy, or an action frame.

Aspect 6: The method of any of Aspects 1-5, wherein receiving the request further comprises receiving the request via a source wireless node, and wherein transmitting the set of packets further comprises transmitting the set of packets via the source wireless node.

Aspect 7: The method of any of Aspects 1-6, wherein identifying the final application sequence number further comprises identifying the final application sequence number at an application layer of the wireless communication device.

Aspect 8: The method of any of Aspects 1-7, wherein identifying the final application sequence number further comprises identifying the final application sequence number based at least in part on at least one of: a data queue, or a current application sequence number.

Aspect 9: The method of Aspect 8, wherein identifying the final application sequence number further comprises identifying the final application sequence number based at least in part on at least one of: a bit rate associated with the connection, or a link setup time.

Aspect 10: The method of any of Aspects 1-9, wherein the final application sequence number indicates a last packet, of the set of packets, to be transmitted via a source wireless node of the connection.

Aspect 11: The method of any of Aspects 1-10, wherein the destination wireless node is the wireless communication device.

Aspect 12: The method of any of Aspects 1-11, wherein the destination wireless node is an access point.

Aspect 13: The method of any of Aspects 1-12, wherein the indication of the final application sequence number comprises at least one of: a sequence number, or a bit indicating whether a corresponding packet is associated with the final application sequence number.

Aspect 14: The method of any of Aspects 1-13, wherein the indication of the final application sequence number is included in an optional field of a header.

Aspect 15: The method of any of Aspects 1-14, wherein the set of packets are associated with a medium access control layer sequence number separate from the final application sequence number.

Aspect 16: A method of wireless communication performed by a peripheral device, comprising: transmitting, to a wireless communication device associated with a connection with the peripheral device, a request indicating a destination wireless node; receiving one or more packets on the connection, the one or more packets omitting a packet associated with a final application sequence number; and transmitting, to the wireless communication device, an indication of a last received application sequence number of the one or more packets based at least in part on the one or more packets omitting the packet associated with the final application sequence number.

Aspect 17: The method of Aspect 16, further comprising: receiving a set of packets associated with one or more sequence numbers occurring between the last received application sequence number and the final application sequence number.

Aspect 18: The method of Aspect 17, wherein receiving the set of packets further comprises receiving the set of packets via the destination wireless node.

Aspect 19: The method of Aspect 17, wherein transmitting the indication of the last received application sequence number is based at least in part on a timer at the peripheral device expiring without having received the packet associated with the final application sequence number.

Aspect 20: The method of Aspect 17, wherein transmitting the indication of the last received application sequence number further comprises transmitting the indication of the last received application sequence number based at least in part on at least one of: a generic attribute over transmission control protocol, a generic attribute over low-energy, or an action frame.

Aspect 21: The method of any of Aspects 16-20, wherein transmitting the request further comprises transmitting the request via a source wireless node, and wherein receiving the one or more packets further comprises receiving the one or more packets via the source wireless node.

Aspect 22: The method of any of Aspects 16-21, wherein the final application sequence number indicates that the packet is a last packet, of the one or more packets, to be transmitted via a source wireless node of the connection.

Aspect 23: The method of any of Aspects 16-22, wherein the destination wireless node is the wireless communication device.

Aspect 24: The method of any of Aspects 16-23, wherein the destination wireless node is an access point.

Aspect 25: The method of any of Aspects 16-24, further comprising receiving an indication of the final application sequence number comprising at least one of: a sequence number, or a bit indicating whether a corresponding packet is associated with the final application sequence number.

Aspect 26: The method of Aspect 25, wherein the indication of the final application sequence number is included in a contributing source field of a header.

Aspect 27: An apparatus for wireless communication at a device, comprising a processor; memory coupled with the processor, and instructions stored in the memory and executable by the processor to cause the apparatus to perform the method of one or more of Aspects 1-26.

Aspect 28: An apparatus for wireless communication at a device, comprising one or more memories and one or more processors coupled to the one or more memories, the one or more processors configured to cause the device to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a wireless communication device, comprising:

one or more memories; and one or more processors, coupled to the one or more memories, configured to cause the wireless communication device to:

receive, from a peripheral device associated with a connection with the wireless communication device, a request indicating a destination wireless node;

identify, based at least in part on the request, a final application sequence number of a set of packets associated with the connection;

transmit the set of packets on the connection, the set of packets including an indication of the final application sequence number;

receive, from the peripheral device, an indication of a last received application sequence number of the set of packets; and transmit one or more packets associated with one or more sequence numbers occurring between the last received application sequence number and the final application sequence number.

2. The apparatus of claim 1, wherein the one or more processors, to cause the wireless communication device to transmit the one or more packets, are configured to cause the wireless communication device to transmit the one or more packets via the destination wireless node.

3. The apparatus of claim 1, wherein receiving the indication of the last received application sequence number is based at least in part on a timer at the peripheral device.

4. The apparatus of claim 1, wherein the one or more processors, to cause the wireless communication device to receive the indication of the last received application sequence number, are configured to cause the wireless communication device to receive the indication of the last received application sequence number based at least in part on at least one of:

a generic attribute over transmission control protocol, a generic attribute over Bluetooth, or an action frame over WiFi.

5. The apparatus of claim 1, wherein receiving the request further comprises receiving the request via a source wireless node, and wherein transmitting the set of packets further comprises transmitting the set of packets via the source wireless node.

6. The apparatus of claim 1, wherein the one or more processors, to cause the wireless communication device to identify the final application sequence number, are configured to cause the wireless communication device to identify the final application sequence number at an application layer of the wireless communication device.

7. The apparatus of claim 1, wherein the one or more processors, to cause the wireless communication device to identify the final application sequence number, are configured to cause the wireless communication device to identify the final application sequence number based at least in part on at least one of:

a data queue, or a current application sequence number.

8. The apparatus of claim 7, wherein the one or more processors, to cause the wireless communication device to identify the final application sequence number, are configured to cause the wireless communication device to identify the final application sequence number based at least in part on at least one of:

a bit rate associated with the connection, or a link setup time.

9. The apparatus of claim 1, wherein the final application sequence number indicates a last packet, of the set of packets, to be transmitted via a source wireless node of the connection.

10. The apparatus of claim 1, wherein the destination wireless node is the wireless communication device.

11. The apparatus of claim 1, wherein the destination wireless node is an access point.

12. The apparatus of claim 1, wherein the indication of the final application sequence number comprises at least one of:

a sequence number, or a bit indicating whether a corresponding packet is associated with the final application sequence number.

13. The apparatus of claim 1, wherein the indication of the final application sequence number is included in an optional field of a header.

14. The apparatus of claim 1, wherein the set of packets are associated with a medium access control layer sequence number separate from the final application sequence number.

15. A method of wireless communication performed by a wireless communication device, comprising:

receiving, from a peripheral device associated with a connection with the wireless communication device, a request indicating a destination wireless node;

identifying, based at least in part on the request, a final application sequence number of a set of packets associated with the connection;

transmitting the set of packets on the connection, the set of packets including an indication of the final application sequence number;

receiving, from the peripheral device, an indication of a last received application sequence number of the set of packets; and transmitting one or more packets associated with one or more sequence numbers occurring between the last received application sequence number and the final application sequence number.

16. The method of claim 15, further comprising:

transmitting the one or more packets, are configured to cause the wireless communication device to transmit the one or more packets via the destination wireless node.

17. The method of claim 15, wherein receiving the indication of the last received application sequence number is based at least in part on a timer at the peripheral device.

18. The method of claim 15, further comprising:

receiving the indication of the last received application sequence number, are configured to cause the wireless communication device to receive the indication of the last received application sequence number based at least in part on at least one of:

a generic attribute over transmission control protocol, a generic attribute over Bluetooth, or an action frame over WiFi.

19. The method of claim 15, wherein receiving the request further comprises receiving the request via a source wireless node, and wherein transmitting the set of packets further comprises transmitting the set of packets via the source wireless node.

20. The method of claim 15, further comprising:

identifying the final application sequence number, are configured to cause the wireless communication device to identify the final application sequence number at an application layer of the wireless communication device.

21. The method of claim 15, further comprising:

identifying the final application sequence number, are configured to cause the wireless communication device to identify the final application sequence number based at least in part on at least one of:

a data queue, or a current application sequence number.

22. The method of claim 21, further comprising:

identifying the final application sequence number, are configured to cause the wireless communication device to identify the final application sequence number based at least in part on at least one of:

a bit rate associated with the connection, or a link setup time.

23. The method of claim 15, wherein the final application sequence number indicates a last packet, of the set of packets, to be transmitted via a source wireless node of the connection.

24. The method of claim 15, wherein the destination wireless node is the wireless communication device.

25. The method of claim 15, wherein the destination wireless node is an access point.

26. The method of claim 15, wherein the indication of the final application sequence number comprises at least one of:

a sequence number, or a bit indicating whether a corresponding packet is associated with the final application sequence number.

27. The method of claim 15, wherein the indication of the final application sequence number is included in an optional field of a header.

28. A non-transitory computer-readable medium storing a set of instructions for wireless communication, the set of instructions comprising:

one or more instructions that, when executed by one or more processors of a wireless communication device, cause the wireless communication device to:

receive, from a peripheral device associated with a connection with the wireless communication device, a request indicating a destination wireless node;

identify, based at least in part on the request, a final application sequence number of a set of packets associated with the connection;

transmit the set of packets on the connection, the set of packets including an indication of the final application sequence number;

receive, from the peripheral device, an indication of a last received application sequence number of the set of packets; and transmit one or more packets associated with one or more sequence numbers occurring between the last received application sequence number and the final application sequence number.

29. The non-transitory computer-readable medium of claim 28, wherein the final application sequence number indicates a last packet, of the set of packets, to be transmitted via a source wireless node of the connection.

30. The non-transitory computer-readable medium of claim 28, wherein the indication of the final application sequence number comprises at least one of:

a sequence number, or a bit indicating whether a corresponding packet is associated with the final application sequence number.

* * * * *